US005797168A

United States Patent [19]

Nagano

[11] Patent Number: 5,797,168
[45] Date of Patent: Aug. 25, 1998

[54] TWO-LOOP COILED TYPE CLAMPING DEVICE

[75] Inventor: Kenji Nagano, Ibaragi, Japan

[73] Assignee: Kabushiki Kaisha Kenlock, Osaka-fu, Japan

[21] Appl. No.: 908,381

[22] Filed: Aug. 7, 1997

[30] Foreign Application Priority Data

Sep. 5, 1996 [JP] Japan ............... 8-257561
Apr. 24, 1997 [JP] Japan ............... 9-122948

[51] Int. Cl.$^6$ ............................................. B65D 63/00
[52] U.S. Cl. ............... 24/20 R; 24/20 CW; 24/20 EE; 24/23 EE
[58] Field of Search ............... 24/20 R, 20 EE, 24/20 S, 20 CW, 23 EE

[56] References Cited

U.S. PATENT DOCUMENTS

| 2,249,764 | 7/1941 | Hothersall | 24/20 EE |
|---|---|---|---|
| 4,622,719 | 11/1986 | Rasmussen et al. | 24/20 R |
| 4,987,651 | 1/1991 | Oetiker | 24/20 R |
| 5,274,886 | 1/1994 | Oetiker | 24/20 R |

FOREIGN PATENT DOCUMENTS 3-209090  9/1991  Japan .
7-50631  11/1995  Japan .

Primary Examiner—Victor N. Sakran
Attorney, Agent, or Firm—Nikaido, Marmelstein, Murray & Oram LLP

[57] ABSTRACT

The present invention provides a two-loop coiled type clamping device for semipermanently fixing a fluid conveying hose, dustproof bellows, axial boot or other article to be fixed 10 to the circumferential connecting surface 32 of a mating device 31, characterized in that in order to elastically accommodate changes in the hardness or thickness of the article 10, it is arranged that in a region where the inner and outer overlap portions 11a and 11b of a clamp band 11 overlap each other through the intermediate overlap portion 11c in three layers by a fixed amount X, a first fixing tooth 18 directed inwardly of the outer overlap portion 11b and a second fixing tooth 22 directed outwardly of the intermediate overlap portion 11c come in seizure engagement with each other and in a region where two-layer overlapping takes place excluding said fixed mount X, a plurality of float leg pieces 23 interposed between the external and internal contact regions X1 and X2 enables the clamp band 11 to store diametrically directed spring force.

9 Claims, 30 Drawing Sheets

TWO-LOOP COILED TYPE CLAMPING DEVICE

BACKGROUND OF THE INVENTION

The present invention relates to a two-loop coiled type clamping device used for semipermanently fixing a fluid conveying hose, dustproof bellows, axial boot or the like made of a plastic material, such as rubber or synthetic resin, to the circumferential connecting surface of a desired mating device.

I have previously proposed such two-loop coiled type clamping device in Japanese Utility Model Publication No. 50631/95.

According to this, a clamp band 11 of fixed length of metal strip material is roll-bent in an overall two-loop circular coiled state to provide a three-dimensional form such that an inner overlap portion 11a which forms one roll-bent end side and as outer overlap portion 11b which forms the other roll-bent end side overlap each other through an intermediate overlap portion in three layers by a fixed amount L. Therefore, as compared with a clamping device which is simply roll-bent in a circular ring state to provide a three-dimensional form with overlapping taking place only in two layers partially by the fixed amount L, there are advantages that the bore diameter D of the clamp band 11 can be lightly contracted with a squeeze operating force (tightening torque) which is as low as only half and that the clamp band can be uniformly contacted with the circumferential surface of an article to be fixed 10 while attaining a very high degree of circularity.

As a result of my subsequent intensive study, however, it has been found that with the arrangement of the aforesaid known utility model, since elastic humps 23 for allowing the clamp band 11 to store spring force are bent up in an outwardly raised state from the outer overlap portion 11b of the clamp band 11, they are liable to break easily under a concentrated stress acting thereon and interfere with surrounding members. Besides this, the biased distribution of weight along the circumferential direction of the clamp band 11 is not without the danger of causing the biasing of tightening force and the deviation and slip-off of the clamping device particularly when the latter is used with vehicles, which are subjected to torque, vibration and shock.

Omission of said humps 23 would be allowed if the article 10 is a product of rubber or the like having elasticity. However, since the clamp band 11 itself does not develop spring force, if the article 10 is a molding of rigid synthetic resin essentially having no elasticity, said omission would result in the article failing to be clamped on the circumferential connecting surface 24 of a mating device safely and firmly in a closely contacted state over the entire surface, and hence there is a worry that the clamping device may deviate or slip off when used with vehicles, which are subjected to torque, vibration and shock.

A measure thereagainst would involve the necessity to fabricate said clamp band 11 with high precision to ensure that its bore diameter D correctly fits to the thickness of the article 10 and the necessity to prepare a variety of kinds which accommodate changes in the thickness of the article 10, thus making it impossible to achieve the economics of mass production.

Further, with the arrangement of said known utility model, the second socket 15 for the operating tool B and the second convex channel wall 16 outwardly raised from the opening edge thereof for supporting the operating tool are located at the severed end of the metal strip material M forming the outer overlap portion 11b, and at a place located closer to the elastic humps 23 than to the severed end, the first and second locking teeth 18 and 21 seizingly engage each other. As a result, there is a fear that during the use of the clamp band 11 through seizure engagement, the clamp band may be in danger of warping outward from said severed end of the metal strip material, whereby the first and second locking teeth 18, 21 become liable to be subjected to a separating force.

SUMMARY OF THE INVENTION

The present invention has been accomplished to solve such problems and its objects are directed solely to a clamping device which is roll-bent in a two-loop circular coiled state over the entire surface to provide a three-dimensional form such that the inner and outer overlap portions of the clamp band overlap each other through an intermediate overlap portion in three layers by a fixed amount. A first object resides in a point wherein while utilizing the places where the intermediate overlap portion overlaps the inner overlap portion and also the outer overlap portion respectively in two layers, a plurality of float leg pieces are distributed in said places to serve as spring elements for the clamp band, so that even if an article to be fixed is a dustproof bellows, axial boot or the like made of rigid synthetic resin material having no elasticity or even if it is a fluid conveying hose of rubber having elasticity and has lost its elasticity due to aging, such article can be brought into entire close contact with the circumferential connecting surface of a mating device with a high degree of circularity over the entire surface, thereby attaining a very high degree of circularity, attaining a safely and firmly clamped state.

A second object resides in a point wherein a plurality of float leg pieces are formed in a distributed state between the external and internal contact regions of the clamp band which are in a two-layer overlap state, thereby precluding biased distribution of weight circumferentially of the clamp band, and a danger of breakage of it due to interference with a surrounding member, which arrangement, combined with the general flattening, allows the clamping device to be used, without any trouble, with vehicles, which are subjected to torque, vibration and shock.

The presence of float leg pieces in a distributed state contributes to effectively dispersing the stress acting thereon, and even if one or more of the float leg pieces should be broken, there is no danger of the clamp band itself instantly losing its spring force or circularity; thus, they also serve to increase durability.

A third object resides in a point wherein in a fixed length of intermediate overlap portion with which the inner and outer overlap portions of the clamp band hold a three-layer overlap state, a first fixing tooth bent inwardly recessedly from the outer overlap portion and a second fixing tooth bent reversely or outwardly raisedly from the intermediate overlap portion seizingly engage each other, so that in connecting and fixing said clamp band in a circular coiled state, the first fixing tooth, if installed on the severed end of the outer overlap portion, precludes the danger of the outer overlap portion being outwardly warped from the severed end and hence the danger of said first and second fixing teeth being disengaged from each other due to such warping.

Other objects may become apparent from the detailed description of preferred embodiments to be later described.

To achieve the above object, the invention provides a two-loop coiled type clamping device wherein a clamp band consisting of a metal strip material cut to a fixed length is roll-bent in a two-loop circular coiled state for three dimensionalization such that the inner and outer overlap portions of the clamp band respectively forming one and the other roll-bent end overlap each other through an intermediate overlap portion in three layers by a fixed amount, the bore diameter of said clamp band being manually forcibly contracted to fix a fluid conveying hose, dustproof bellows, axial boot or other article to be fixed to the circumferential connecting surface of a desired mating device, firstly, said clamping device being characterized in that the one severed end of said inner overlap portion alone is cut to form a pilot nose having a fixed width smaller than the fixed width of the metal strip material, said inner overlap portion being formed with a first tool receiving hole, and a first tool locking tooth is bent out in an outwardly raised state from the opening edge of the first tool receiving hole on the side adjacent said pilot nose, said outer overlap portion is formed with a first fixing tooth receiving hole and a second tool receiving hole which are juxtaposed in the order mentioned as seen from the other severed end side, while a first fixing tooth is bent out in an inwardly recessed state from the opening edge of the first fixing tooth receiving hole on the other severed end side and a second tool locking tooth is bent out in an outwardly raised state from the opening edge of the second tool receiving hole on the side adjacent the first fixing tooth receiving hole, said intermediate overlap portion is formed with a nose receiving hole for relief reception of the pilot nose of the inner overlap portion and a communication hole for relief reception of said first tool locking tooth of said inner overlap portion which are in juxtaposed relation to each other, while a second fixing tooth is bent out in an outwardly raised state from the opening edge of said communication hole on the side adjacent said nose receiving hole, the arrangement being such that when the bore diameter of said clamp band is forcibly contracted by applying the pair of working teeth of a draw operating tool to the first and second tool locking teeth of the inner and outer overlap portions respectively, to draw said pair of working teeth 33 toward each other, the first and second fixing teeth of the outer and intermediate overlap portions, respectively, come in seizure engagement with each other, a plurality of distributed float leg pieces are cut up in an inwardly bent state from an external contact region extending from the tool relief reception communication hole in the intermediate overlap portion to the second tool receiving hole in the outer overlap portion, the cut-up front ends of said float leg pieces being elastically contacted with an internal contact region extending from the nose receiving hole in the intermediate overlap portion overlapping said external overlap region in two layers to the first tool receiving hole in the inner overlap portion, thereby storing diametrically directed spring force in said clamp band, secondly, said clamping device being characterized in that the one severed end of said inner overlap portion alone is cut to form a pilot nose having a fixed width smaller than the fixed width of the metal strip material, said inner overlap portion being formed with a first tool receiving hole, and a first tool locking tooth is bent out in an outwardly raised state from the opening edge of the first tool receiving hole on the side adjacent said pilot nose, said outer overlap portion is formed with a first fixing tooth receiving hole and a second tool receiving hole which are juxtaposed in the order mentioned as seen from the other severed end side, while a first fixing tooth is bent out in an inwardly recessed state from the opening edge of the first fixing tooth receiving hole on the other severed end side and a second tool locking tooth is bent out in an outwardly raised state from the opening edge of the second tool receiving hole on the side adjacent the first fixing tooth receiving hole, said intermediate overlap portion is formed with a nose receiving hole for relief reception of the pilot nose of the inner overlap portion and a communication hole for relief reception of said first tool locking tooth of said inner overlap portion which are in juxtaposed relation to each other, while a second fixing tooth is bent out in an outwardly raised state from the opening edge of said communication hole on the side adjacent said nose receiving hole, the arrangement being such that when the bore diameter of said clamp band is forcibly contracted by applying the pair of working teeth of a draw operating tool to the first and second tool locking teeth of the inner and outer overlap portions, respectively, to draw said pair of working teeth toward each other, the first and second fixing teeth of the outer and intermediate overlap portions, respectively, come in seizure engagement with each other, a plurality of distributed float leg pieces are cut up in an outwardly bent state from an internal contact region extending from the nose receiving hole in the intermediate overlap portion to the first tool receiving hole in the inner overlap portion, the cut-up front ends of said float leg pieces being elastically contacted with an external contact region extending from the tool relief reception communication hole in the intermediate overlap portion overlapping said internal overlap region in two layers to the second tool receiving hole in the outer overlap portion, thereby storing diametrically directed spring force in said clamp band.

According to the characterized arrangement of the invention described above, it is simply because the invention is based on the premise that the intended clamping device is one which is roll-bent in an overall two-loop coiled state with the inner and outer overlap portions of the clamp band overlapping each other through the intermediate overlap portion in three layers, that the above objects can be substantially achieved whether or reversely a plurality of float leg pieces cut up in an outwardly bent state from the internal contact region are elastically contacted with the external contact region opposed thereto, such float leg pieces serving as spring elements for the clamp band, capable of elastically accommodating changes in the hardness or thickness of the article to be fixed.

DESCRIPTION OF THE PREFERRED EMBODIMENTS

Figure 1:
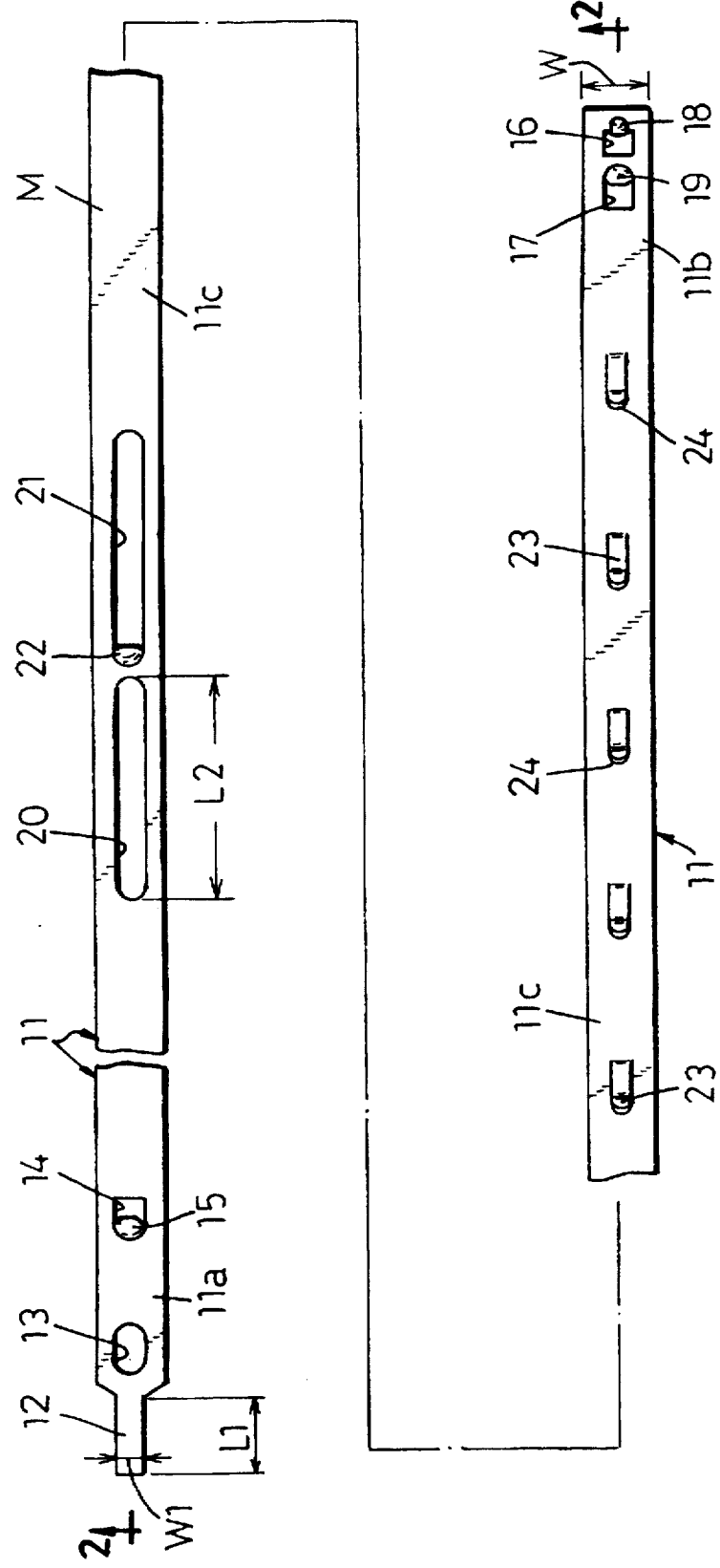
FIG. 1 is a fragmentary plan view showing the developed planar state of a clamping device according to a first embodiment of the invention.
Figure 2:
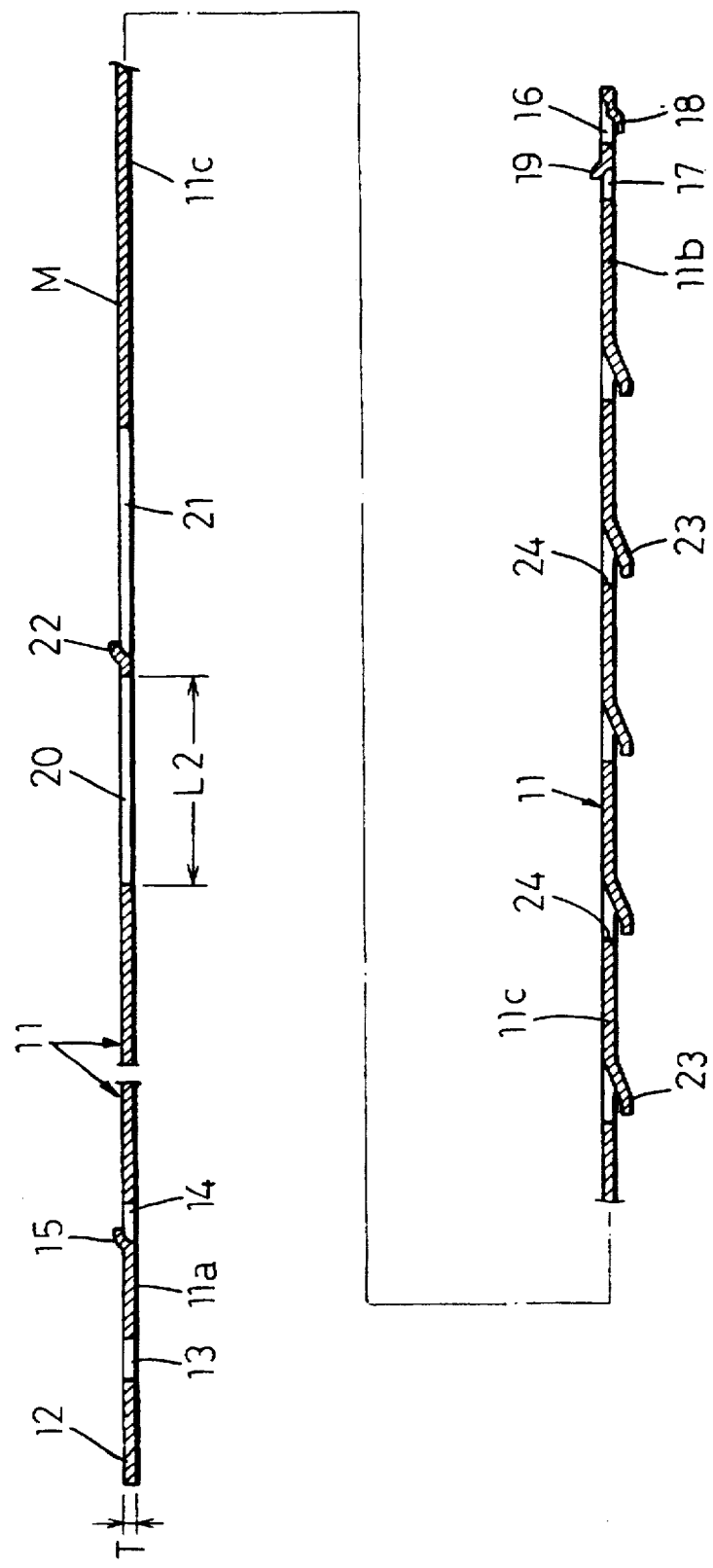
FIG. 2 is a sectional view taken along the line 2—2 in FIG. 1.

The concrete arrangement of the present invention will now be described in detail with reference to the drawings. FIGS. 1 and 2 show a developed planar state (or a material processing state) of a clamping device according to a first embodiment of the invention, and FIGS. 3 through 9 show a roll-bent three-dimensionalized product and how it is used. As a material for the clamping device, use is made of stainless steel (for example, SUS 301, 304, 316 or 430) or a like metal strip M having a fixed thickness T (e.g., about 0.5–1.0 mm) and a fixed width W (e.g., about 7–10 mm), such long-sized material being cut into lengths having a fixed length L suited to the thickness of an article to be fixed 10, such as a liquid conveying hose, dustproof bellows, axial boot or the like.

The numeral 11 denotes a clamp band made of said metal strip material M cut to a fixed length which is then roll-bent in two loops for three-dimensionalization in the form of a circular ring as seen in front view, contributing, as it were, directly to the clamping action on the article 10, it being held in a partial three-layer overlap state by a fixed amount X such that the other roll-bent end side indirectly externally contacts the one roll-bent end side.

That is, the clamp band 11 with one roll-bent end side forming an inner overlap portion 11a and the other roll-bent end side forming an outer overlap portion 11b is roll-bent in a two-loop coiled state over the entire surface for three dimensionalization such that it overlaps in three layers by the fixed amount X in an intermediate position.

The character 11c denotes an intermediate overlap portion interposed between said inner and outer overlap portions 11a and 11b in said three-layer overlap region in the fixed amount X. As said intermediate overlap portion 11c extends from said three-layer overlap region in the fixed amount X to one roll-bent end side of the clamp band, it assumes a two-layer overlap state internally contacting said outer overlap portion 11b and, similarly, as it extends from said three-layer overlap region to the other opposite roll-bent end side, it assumes a two-layer overlap state externally contacting said inner overlap portion 11a.

Said clamp band 11 has, of course, the fixed width W of the metal strip material M itself, but one severed end alone of the inner overlap portion 11a is formed as a pilot nose 12 having a fixed width W1 which is less than about a third of the fixed width W of the metal strip material M by cutting the opposite edges of the metal strip material M. The extending length L1 of the nose 12 is, for example, about 7–10 mm.

The numeral 13 denotes a roll-bending formation locking pin receiving hole disposed in the vicinity of the extending proximal end of said pilot nose 12 and formed as an approximately circular or elliptic opening as seen in plan view, said hole 13 being adapted to receive a locking pin extending upright from the circumferential surface of a roll-bending formation mandrel roll in a forming machine (not shown), said hole 13 being used in a state of engagement with the locking pin to roll-bend said clamp band 11 in a circular coiled state for three-dimensionalization in that said mandrel roll is rotated.

The numeral 14 denotes a first tool receiving hole disposed more remote from the one severed end of said inner overlap portion 11a than is said locking pin receiving hole 13. It is substantially quadrangular or elliptic as seen in plan view, and a first tool locking tooth 15 is bent in an outwardly raised state to a height substantially corresponding to the fixed thickness T of the metal strip material M itself from the opening edge on the side where said pilot nose 12 exists. The outwardly raised first tool locking tooth 15 acts as an auxiliary bead which is capable of counteracting the drawing force (the clamp band bore diameter contracting force) exerted by a draw operating tool to be later described.

On the other hand, the outer overlap portion 11b of the clamp band 11 which is to come in external contact with said inner overlap portion 11a in a three-layer overlap state is formed with a first fixing tooth receiving hole 16 and a second tool receiving hole 17 in juxtaposed relation in the order mentioned as seen from the other severed end side.

These two are also quadrangular or elliptic in plan view, and the opening edge of the first fixing tooth receiving hole 16 on said other severed end side is bent to form a first fixing tooth 18 which is inwardly recessed to a depth substantially corresponding to the fixed thickness T of the metal strip material M itself. In addition, the width of said first and second tool receiving holes 14 and 17 and the first fixing tooth receiving hole 16 is a little more than a third of the fixed width W of the metal strip material M.

Further, a second tool locking tooth 19 is bent in an outwardly raised state to a height substantially corresponding to the fixed thickness T of the metal strip material M itself from the opening edge of said second tool receiving hole 17 on the side adjoining to the first fixing tooth receiving hole 16, said tooth 19 serving to function as a reinforcing bead for the same purpose as that of the first tool locking tooth 15 in said inner overlap portion 11a.

Further, 20 denotes a nose receiving hole which is formed in the intermediate overlap portion 11c existing in the region where the inner and outer overlap portions 11a and 11b overlap in three layers by the fixed amount X and which extends narrow longitudinally of the metal strip material M, said hole 20 receiving the pilot nose 12 of said inner overlap portion 11a, thereby keeping the inner peripheral surface (clamping surface) of the clamp band 11 in a flush state. Further, L2 denotes the opening length of the nose receiving hole 20, which is much greater than the extending length L1 of the pilot nose 12. The opening width of the nose receiving hole 20 is a little greater than the fixed width W1 of the pilot nose 12, of course.

The numeral 21 denotes a communication hole for tool relief reception which is formed elongated in the intermediate overlap portion 11c in juxtaposed relation to the nose receiving hole 20, said communication hole 21 communicating with the first tool receiving hole 14 in said inner overlap portion 11a to receive said first tool locking tooth 15 therein.

Therefore, there is no danger that during draw operation on the clamp band by means of said operating tool, the intermediate overlap portion 11c and the inner overlap portion 11a which internally contacts the same in two layers may deviate relatively transversely (axially). In addition, the opening width of the tool relief reception communication hole 21 is substantially the same as the width of said first and second tool receiving holes 14, 17, the first fixing tooth receiving hole 16 and the nose receiving hole 20.

The opening edge of said tool relief reception communication holes 21 is bent to form a second fixing tooth 22 which is outwardly raised to a height substantially corresponding to the fixed thickness T of the metal strip material M itself, said second fixing tooth 22 being capable of seizure engagement with the first fixing tooth 18 of said outer overlap portion 11b.

That is, the second fixing tooth 22 which is bent outwardly raisedly from the intermediate overlap portion 11c and the first fixing tooth 18 which is bent inwardly recessedly from said outer overlap portion 11b which externally contacts said second fixing tooth 22 are adapted to seizingly engage each other with their tooth mutually reversely directed and in an overlap plane where the outer and intermediate overlap portions 11b and 11c overlap each other in two layers.

Then, the pilot nose 12 of the inner overlap portion 11a internally contacting said intermediate overlap portion 11c run into the nose receiving hole 20 in the intermediate overlap portion 11c, and similarly the first tool locking tooth 15 bent outwardly raisedly from the inner overlap portion 11a is received in the communication hole 21 in the intermediate overlap portion 11c; therefore, in spite of the clamping device being of the two-loop coiled type, the clamp band 11 can be made remarkably flat as a whole and its inner peripheral surface (clamping surface) can be maintained in a highly true circle state.

As the intermediate overlap portion 11c of the clam band 11 extends from the three-layer overlap region in the fixed amount X toward the one and the other roll-bent end side, it is maintained in a two-layer overlap state with respect to the inner and outer overlap portions 11a and 11b, respectively, as described above. An external contact region X1 extending from the tool relief reception communication hole 21 in said intermediate overlap portion 11c opposed to the two-layer overlap region to the second tool receiving hole 17 in the outer overlap portion 11b is formed with a plurality of float leg pieces 23 distributed throughout the external contact region X1, and cut up preferably in an inwardly bent state to a depth corresponding to the fixed thickness T of the metal strip material M itself.

These float leg pieces 23 serve to float the external contact region X1 where they are cut up and distributed above an internal contact region X2 extending from said intermediate overlap portion 11c internally contacted in a two-layer overlap state to the first tool receiving hole 14 in the inner overlap portion 11a, with a fixed gap S maintained therebetween, thereby storing spring force along the diametrical direction of the clamp band 11.

Regarding this point, in the first embodiment shown in FIGS. 1 through 9, the metal strip material M is formed on its longitudinal centerline with cutting lines 24 U-shaped in plan view, which are cut with a fixed spacing pitch in a distributed state, and float leg pieces 23 are inwardly bent up from the cutting lines 24, the front ends of said float leg pieces 23 being elastically contacted with the internal contact region X2 which overlaps said external contact region X1 in two layers.

That is, in cases where the article to be fixed 10 is a molding of rigid synthetic resin originally having no elasticity, such as a dustproof bellows or axial boot, said float leg pieces 23 of the clamp band 11 for claming the same cause the clamp band 11 itself to develop spring force, the intention being to utilize the restoring repulsive force of tensile deformation along the diametrical direction as a reliable clamping force enabling the clamp band 11 to generally closely contact the article 10.

More specifically, in the two-layer overlap region, different from the region of the clamp band 11 where three-layer overlapping by said fixed amount X takes place, a plurality of float leg pieces 23 cut up in an inwardly bent state from the external contact region X1 are used to act as spring elements for the clamp band 11 itself to elastically accommodate or finely adjust changes in the hardness or thickness of the article 10 to enable the clamp band to closely contact the article 10 over the entire surface at all times.

Such clamping device of the invention can be mass-produced from said stainless steel or other metal strip material M, as follows.

Figure 11:
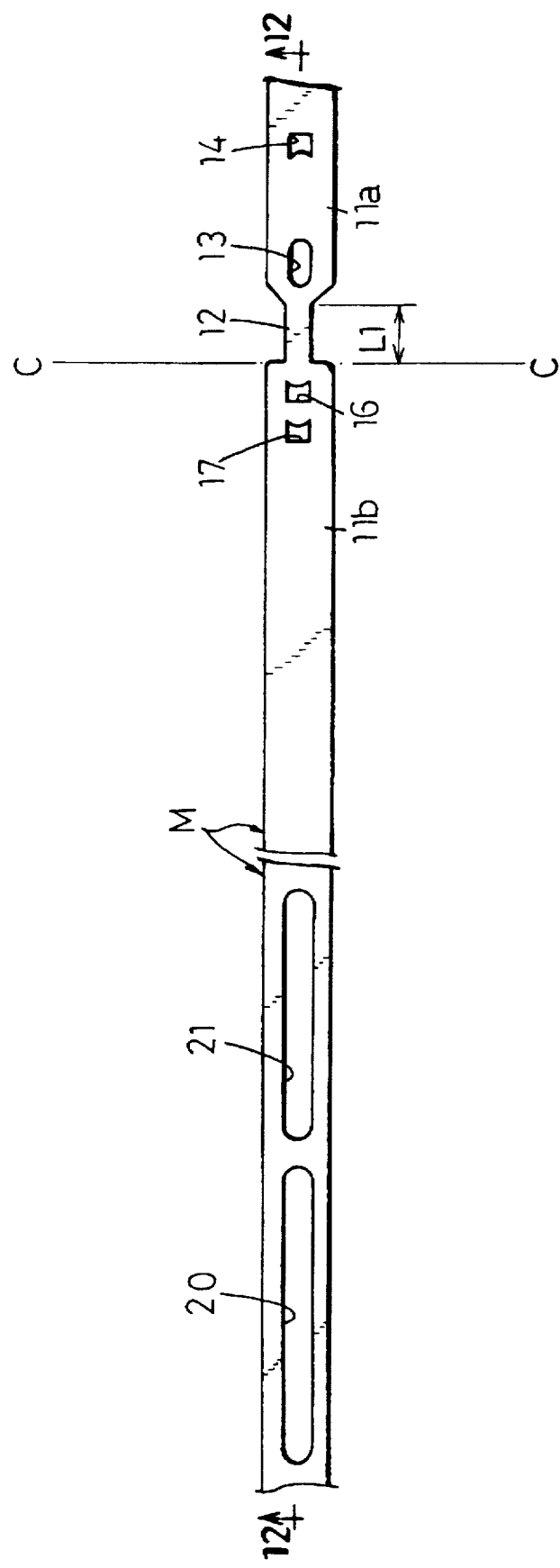
FIG. 11 is an enlarged plan view of a portion of FIG. 10.
Figure 12:
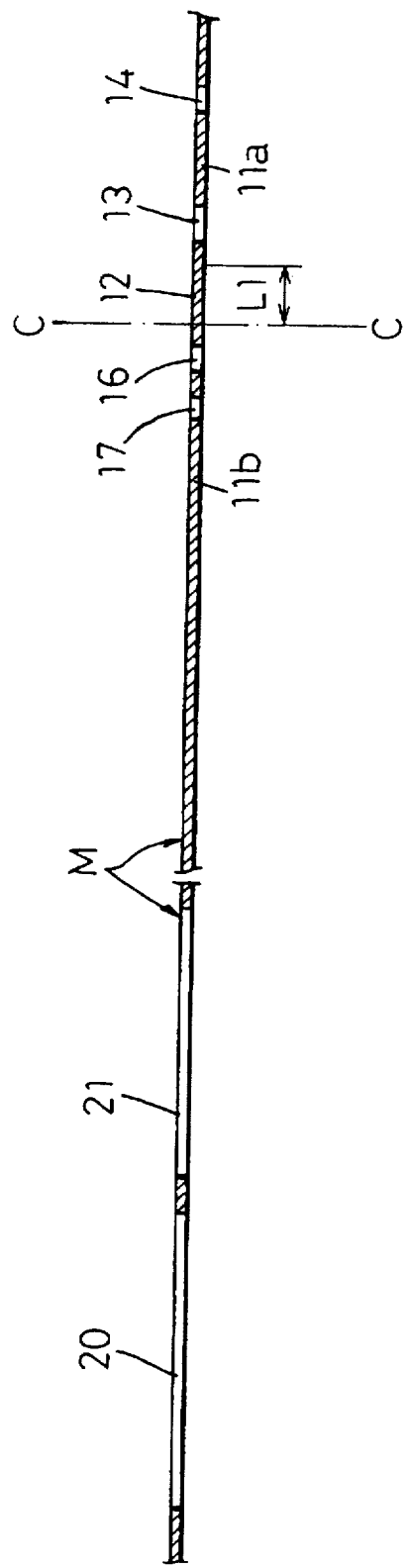
FIG. 12 is a sectional view taken along the line 12—12 in FIG. 11.

In the process of automatically intermittently moving the metal strip material M, which is long-sized having a predetermined length, in one direction along a transfer line, punching is effected to form the pilot nose 12 of the clamp band 11, the locking pin receiving hole 13, the first and second tool receiving holes 14 and 17, the first fixing tooth receiving hole 16, the nose receiving hole 20, and the tool relief reception communication hole 21. This process is as shown in FIGS. 10 through 12.

Figure 13:
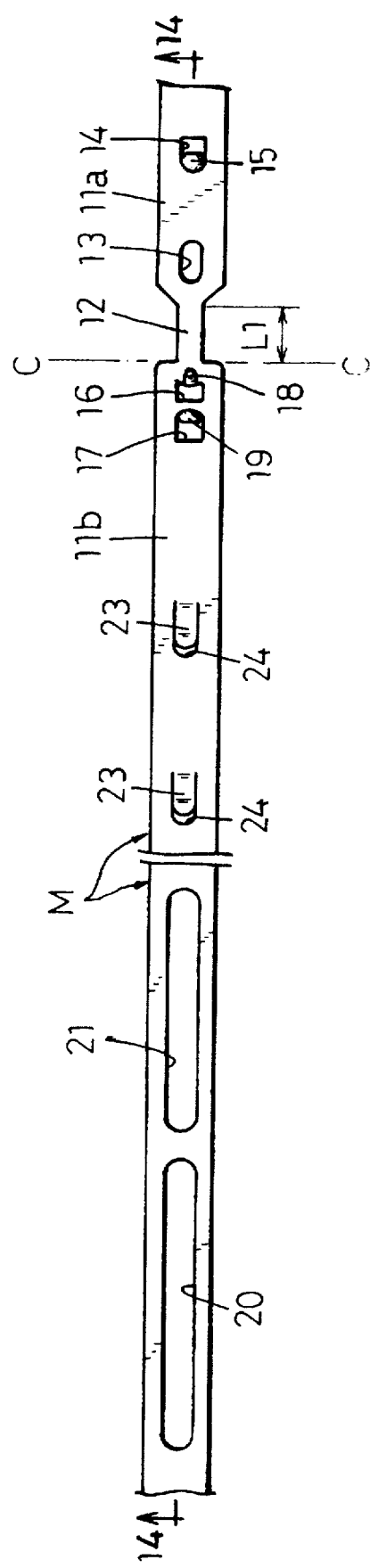
FIG. 13 is an enlarged plan view corresponding to FIG. 11, showing the clamping device which is in a bent-up state subsequent to punching out.
Figure 14:
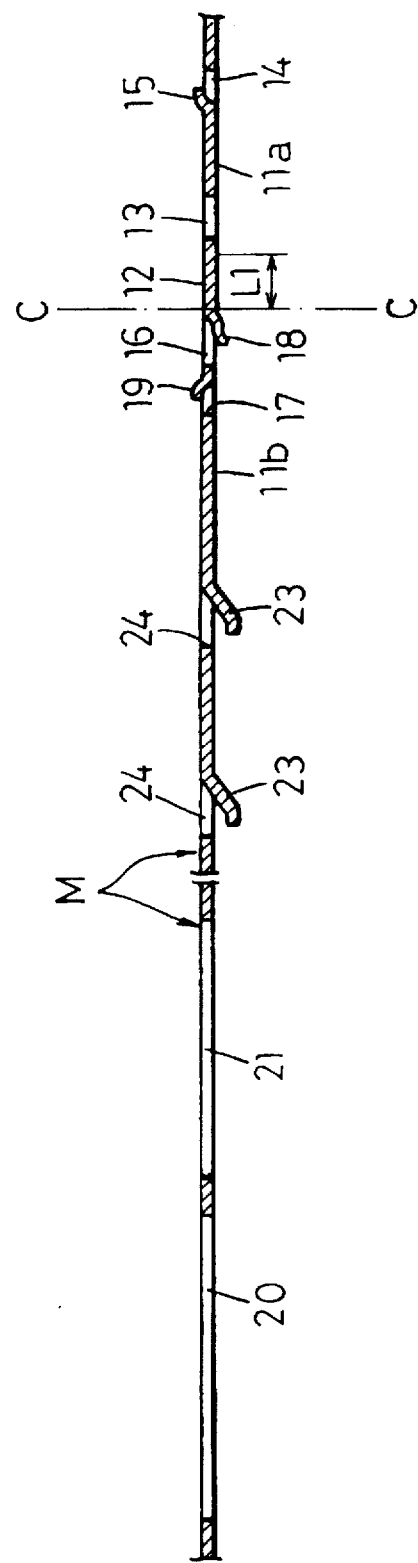
FIG. 14 is a sectional view taken along the line 14—14 in FIG. 13.

Thereafter, the metal strip material M is passed through a press bend-up die (not shown) to carry out the bending-up of the first and second tool locking teeth 15, 19 and the first and second fixing teeth 18, 22 and the cutting-up of the float leg pieces 23, at a stroke. This process is as shown in FIGS. 13 and 14. In this case, the first and second tool locking teeth 15, 19 and the second fixing tooth 22 are outwardly bent up, whereas the first fixing tooth 18 and the float leg pieces 23 are reversely or inwardly bent up, of course.

Figure 4:
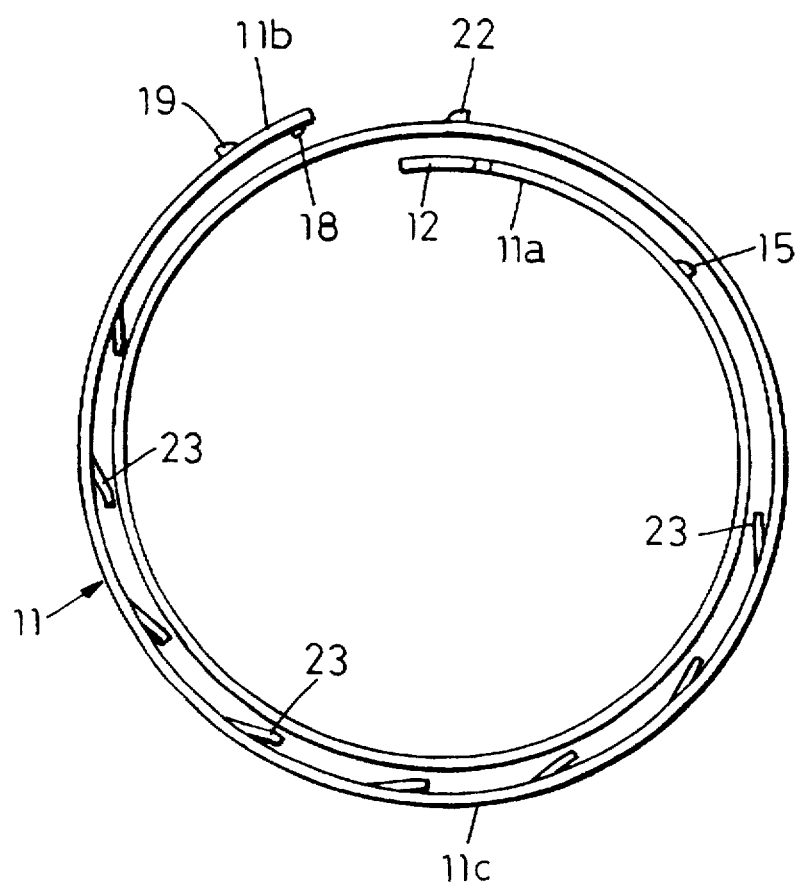
FIG. 4 is a front view of FIG. 3.
Figure 5:
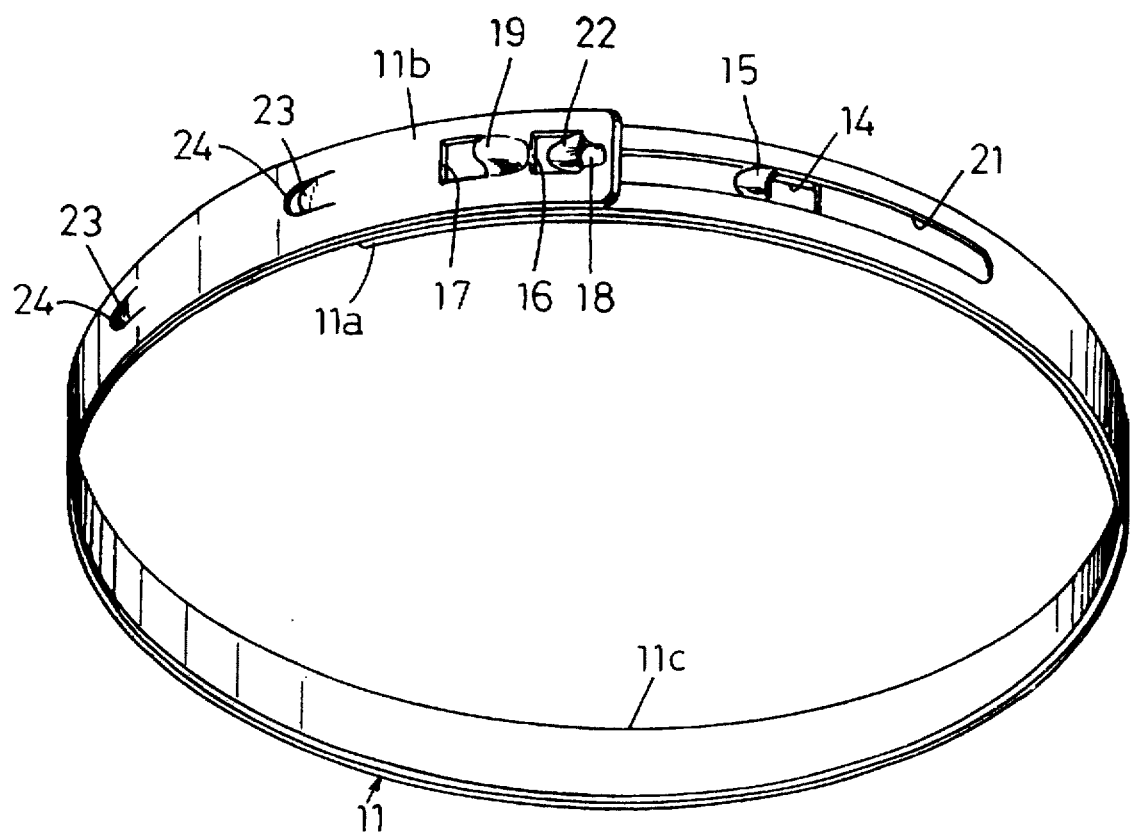
FIG. 5 is a perspective view showing the tightened state of FIG. 3.
Figure 6:
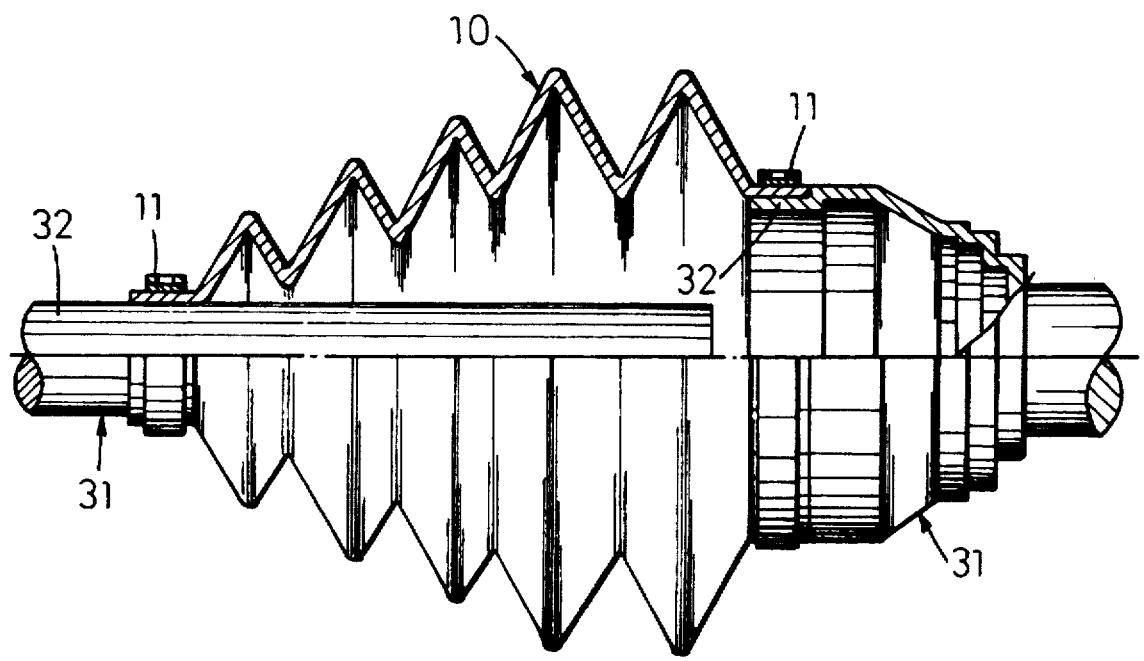
FIG. 6 is a view, half in section, showing how it is used with an article to be fixed.
Figure 7:
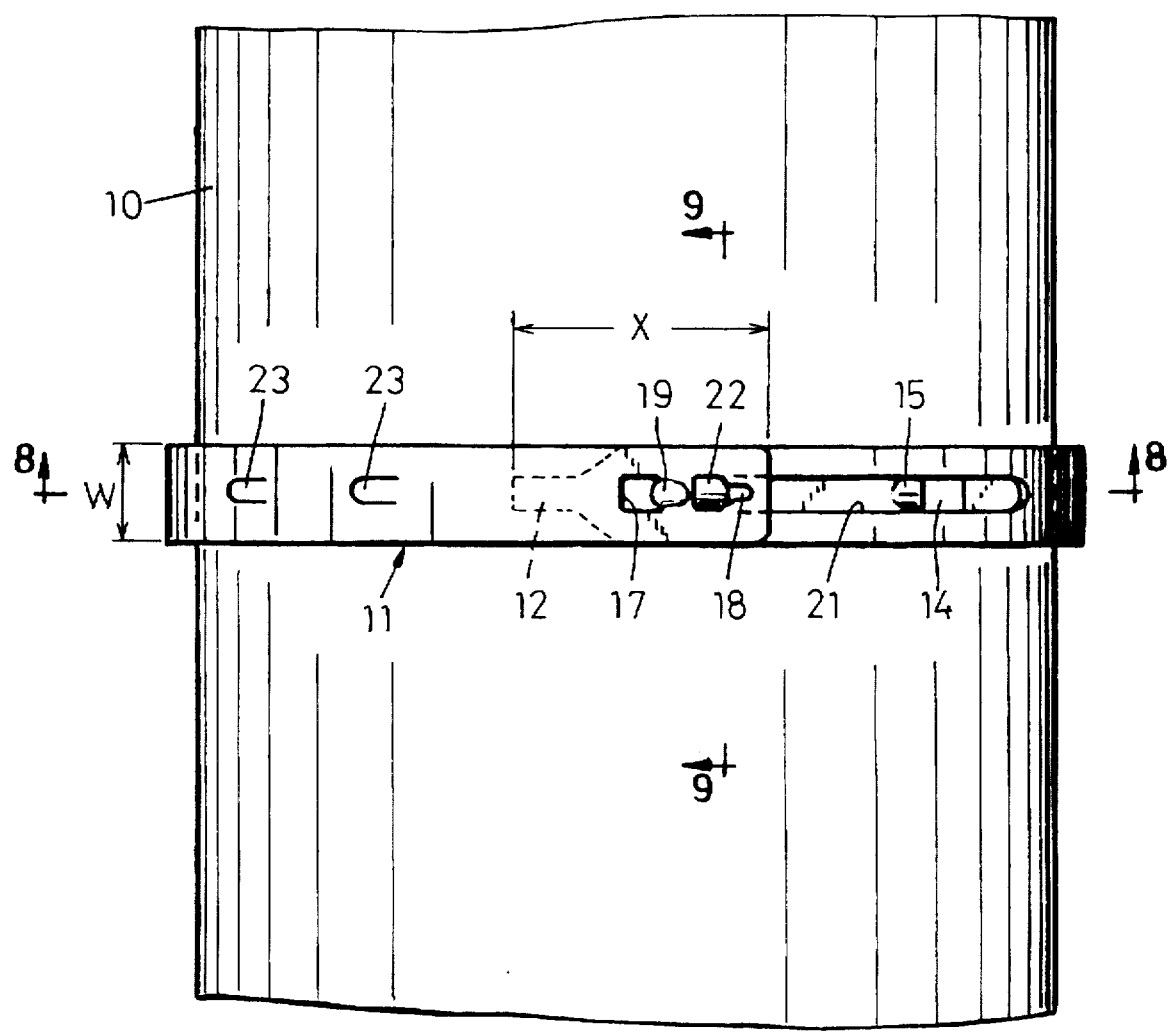
FIG. 7 is a partial enlarged plan view of FIG. 6.

Subsequently, the metal strip material M is severed at a position indicated by the character C—C in FIGS. 10 through 14, to provide the clamp band 11 having a required fixed length L. Finally, the clamp band 11 of fixed length L which is still in a developed planar state is fed into a forming machine (not shown), whereby it is roll-bent in a two-loop coiled state for three dimensionalization such that said inner and outer overlap portions 11a and 11b overlap each other through the intermediate overlap portion 11c in three layers in the fixed amount X, thus providing a product as shown in FIGS. 3 through 5.

Figure 10:
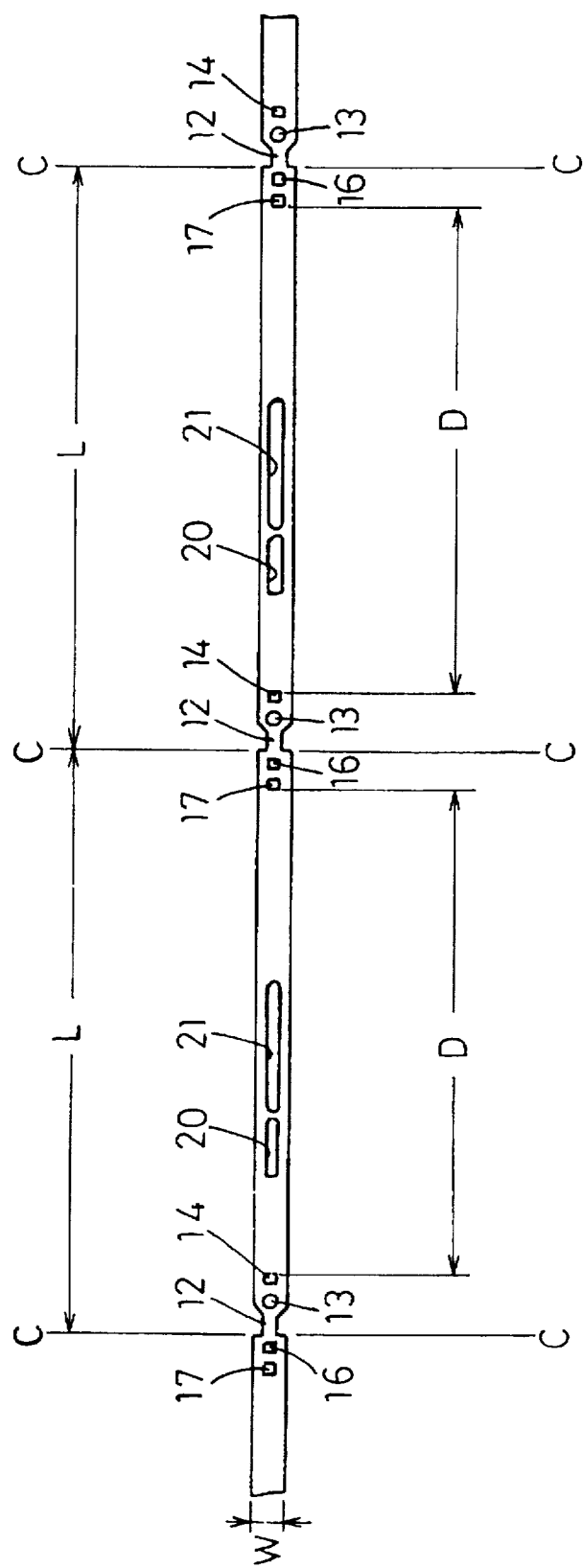
FIG. 10 is a plan view of a clamping device shown punched out of a metal strip material.

In that case, as suggested from FIG. 10, the distance D between the first and second tool receiving holes 14 and 17 in the inner and outer overlap portions 11a and 11b, respectively, of the clamp band 11 is varied long and short as by controlling the feed rate of the metal strip material M, whereby a variety of clamping devices to accommodate changes in the thickness of the article to be fixed 10 can be produced with extreme ease. In producing a variety of clamping devices having different bore diameters, the need of remodeling said press die each time is thus eliminated. This arrangement is very superior in accommodation and mass production.

FIGS. 15 through 28 show a second embodiment through a seventh embodiment corresponding to the first embodiment shown in FIGS. 1 through 9. Essentially, in the two-layer overlap region different from the region of the clamp band 11 where three-layer overlapping by a fixed amount X takes place, if a plurality of float leg pieces 23 present between the external and internal contact regions X1 and X2 act as spring elements for the clamp band 11 itself and thereby elastically accommodate or finely adjust changes in the hardness or thickness of the article 10 to enable the clamp band to closely contact the article 10 over the entire surface, then various arrangements shown in FIGS. 15 through 28 can be employed.

Figure 3:
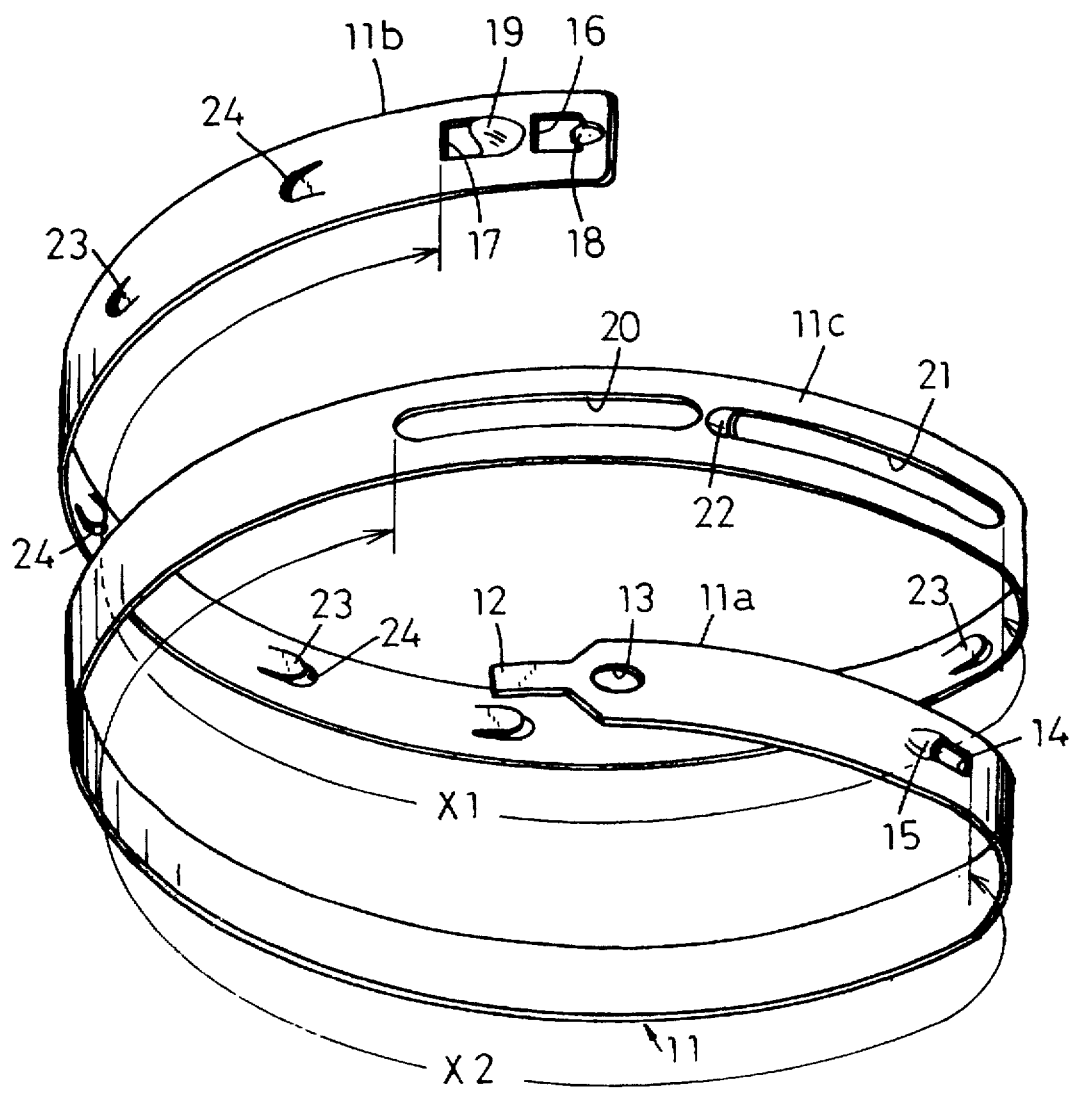
FIG. 3 is a perspective view showing a product which is roll-bent in a three-dimensional form.
Figure 8:
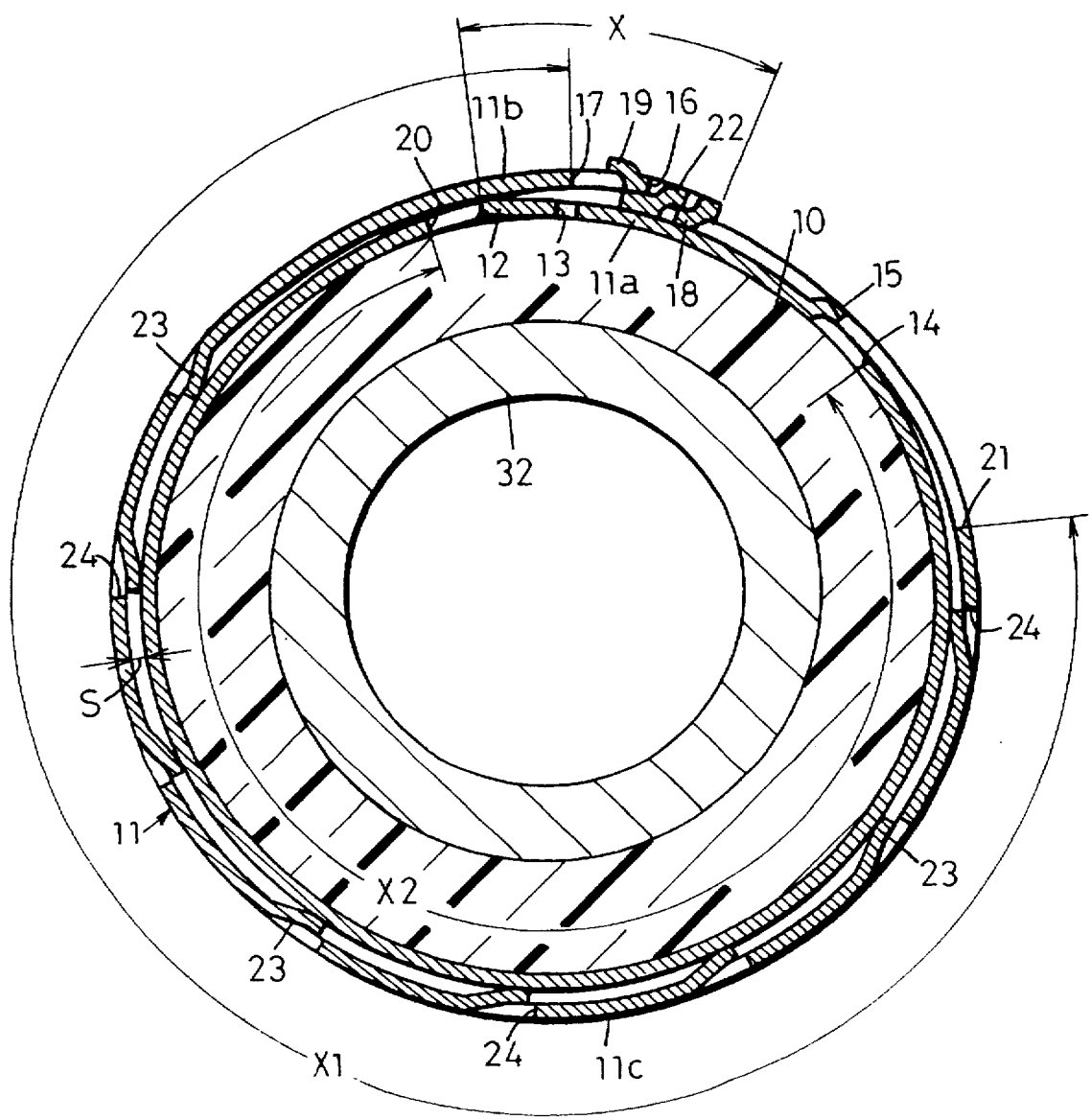
FIG. 8 is an enlarged sectional view taken along the line 8—8 in FIG. 7.
Figure 9:
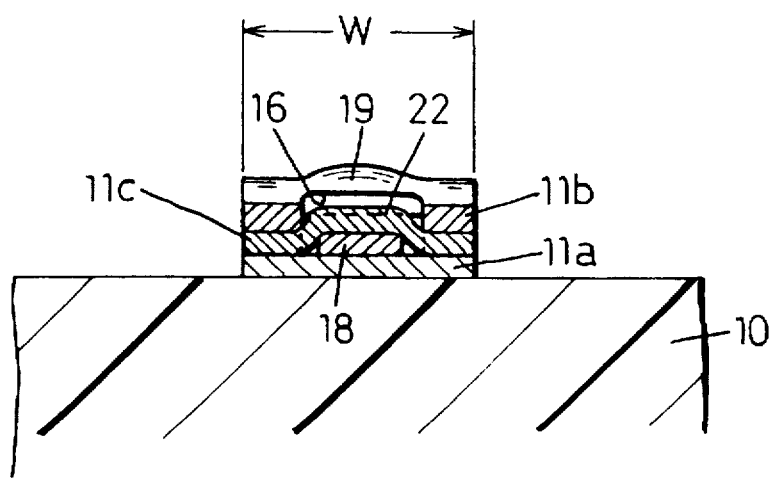
FIG. 9 is an enlarged sectional view taken along the line 9—9 in FIG. 7.
Figure 15:
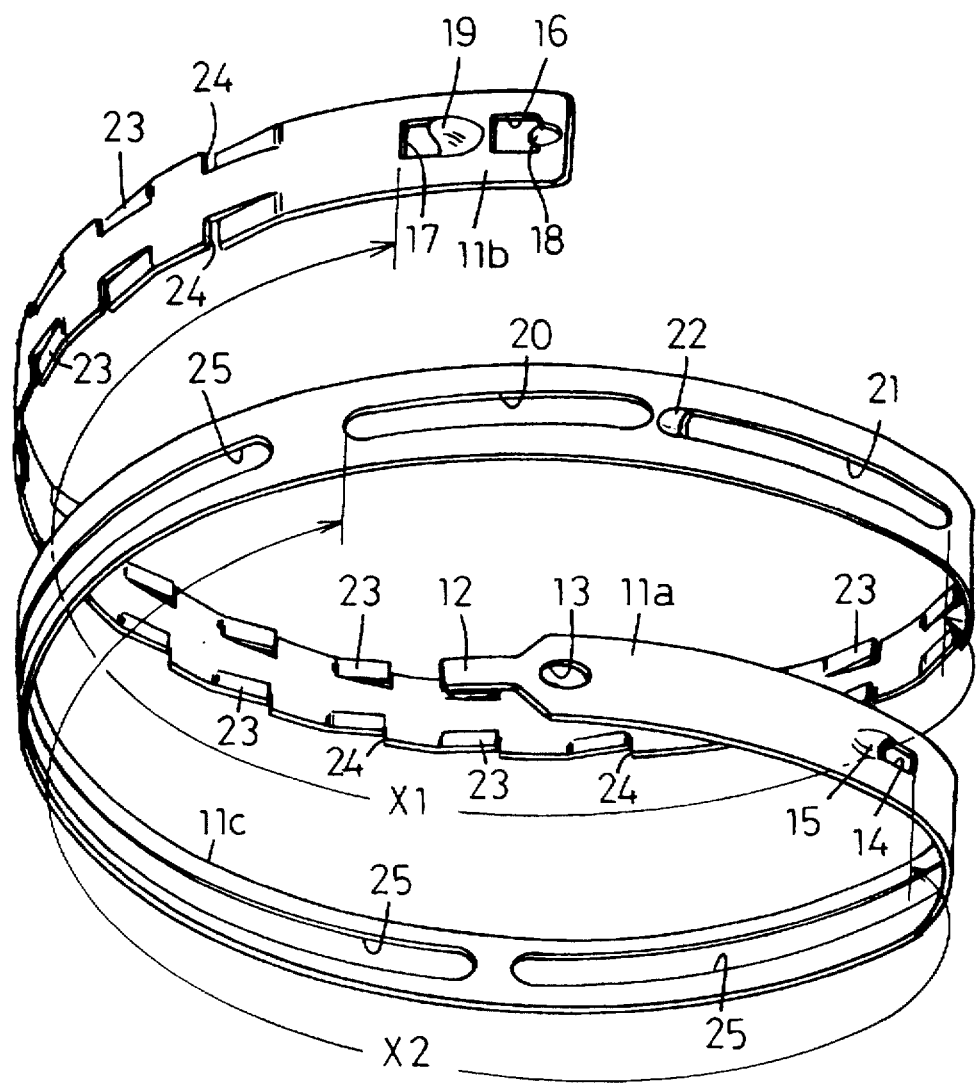
FIG. 15 is a perspective view corresponding to FIG. 3, showing a second embodiment.
Figure 16:
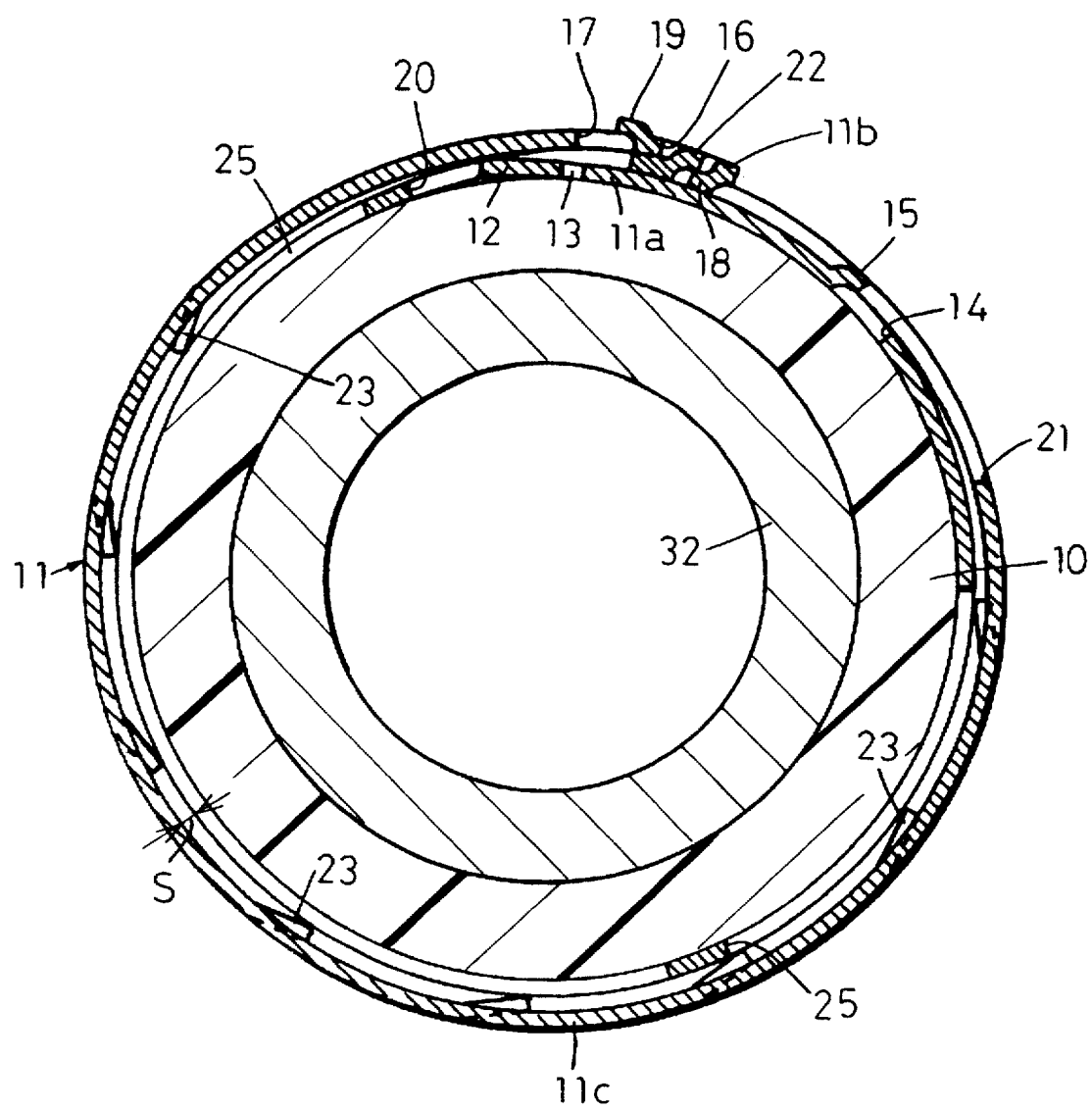
FIG. 16 is a sectional view showing a state of use of FIG. 15.

As is clear, e.g., from the second embodiment shown in FIGS. 15 and 16 corresponding to FIGS. 3 and 8, cutting lines 24 shaped like opposed L's as seen in plan view are formed in opposed side edges of the metal strip material M in a juxtaposed state in which they are distributed with a fixed spacing pitch, and float leg pieces 23 may be inwardly bent up from each pair of cutting lines 24.

Figure 17:
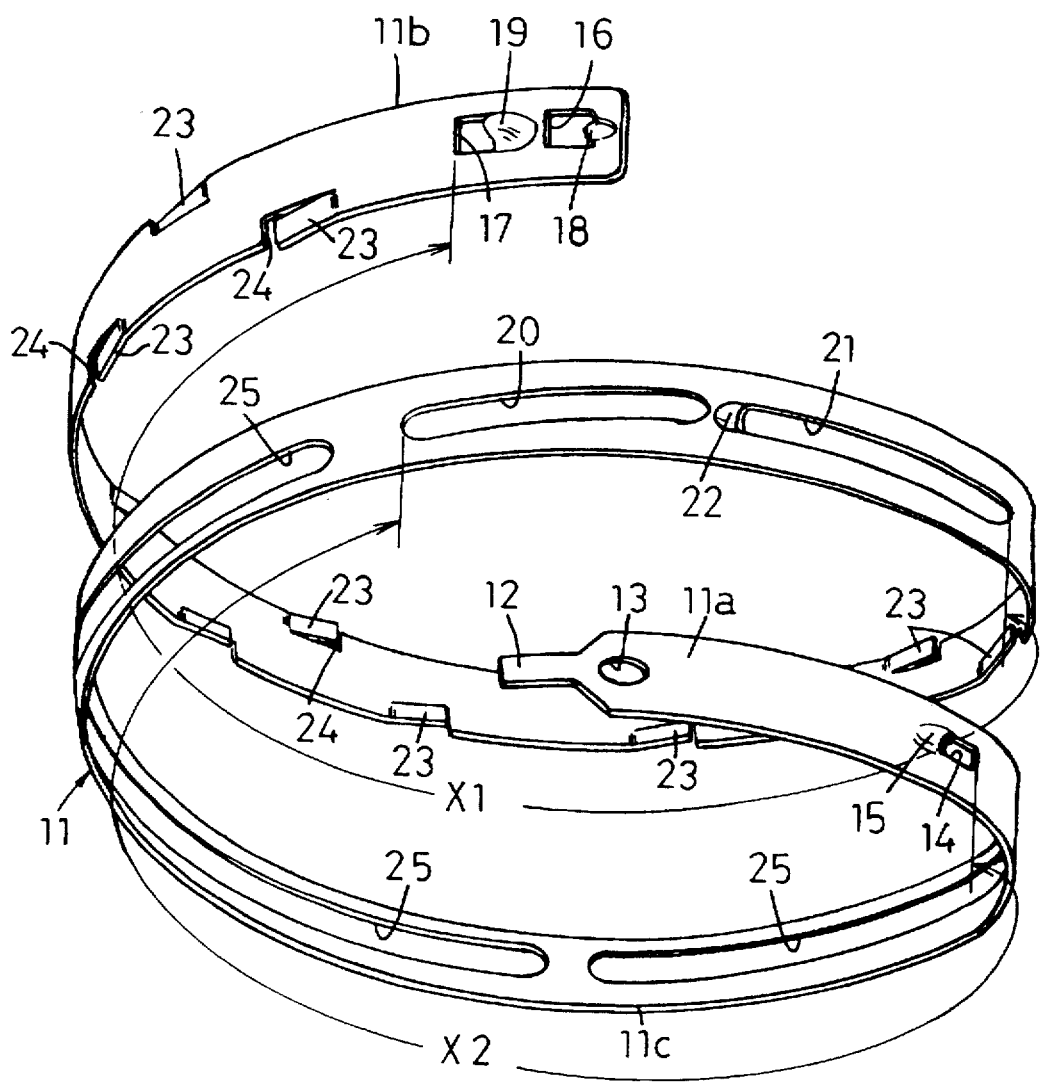
FIG. 17 is a perspective view corresponding to FIG. 3, showing a third embodiment of the invention.

Further, as shown in a third embodiment shown in FIG. 17, cutting lines 24 which are L-shaped in plan view may be formed in opposite side edges of the metal strip material M in a zigzag pattern with a fixed spacing pitch to allow leg pieces 23 to be inwardly bent up from the cutting lines 24.

The reason is that even if the second and third embodiments shown in FIGS. 15 through 17 are employed, the clamp band 11 is fixed by seizure engagement between the first and second fixing teeth 18 and 22 of the outer and intermediate overlap portions 11b and 11c, respectively, and the pilot nose 12 forming one severed end of the inner overlap portion 11a is in a state of being slidable circumferentially of the clamp band 11, making it possible to exert a diametrically directed spring force on the inner peripheral surface (clamping surface) of the clamp band 11.

Particularly, according to the arrangements of the second and third embodiments, since the float leg pieces 23 are distributed at positions deviated to opposite side edges of the metal strip material, one or a plurality of very elongated punched holes 25 can be formed without interfering with said float leg pieces 23, said punched holes 25 contributing to a decrease in the weight of the clamp band 11 itself.

Figure 18:
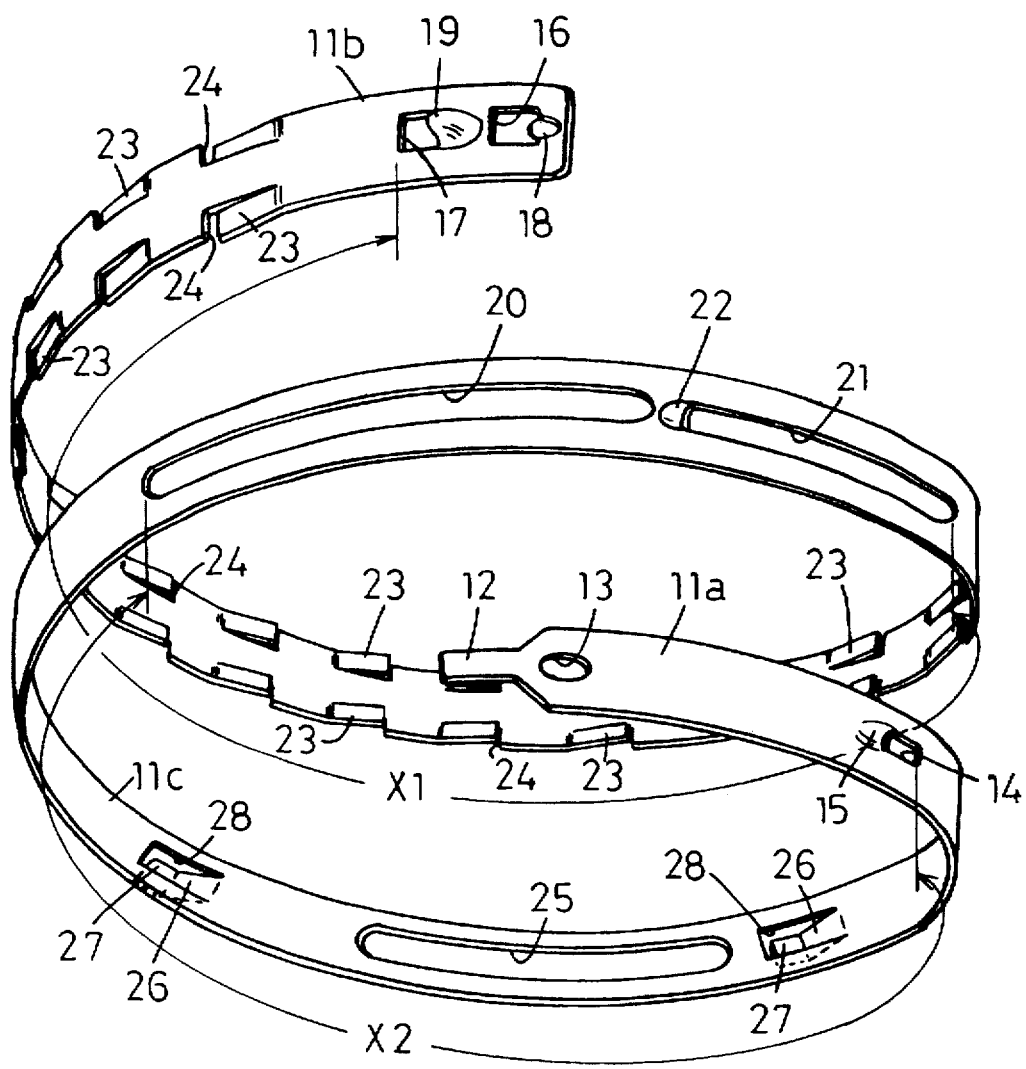
FIG. 18 is a perspective view corresponding to FIG. 3, showing a fourth embodiment of the invention.
Figure 19:
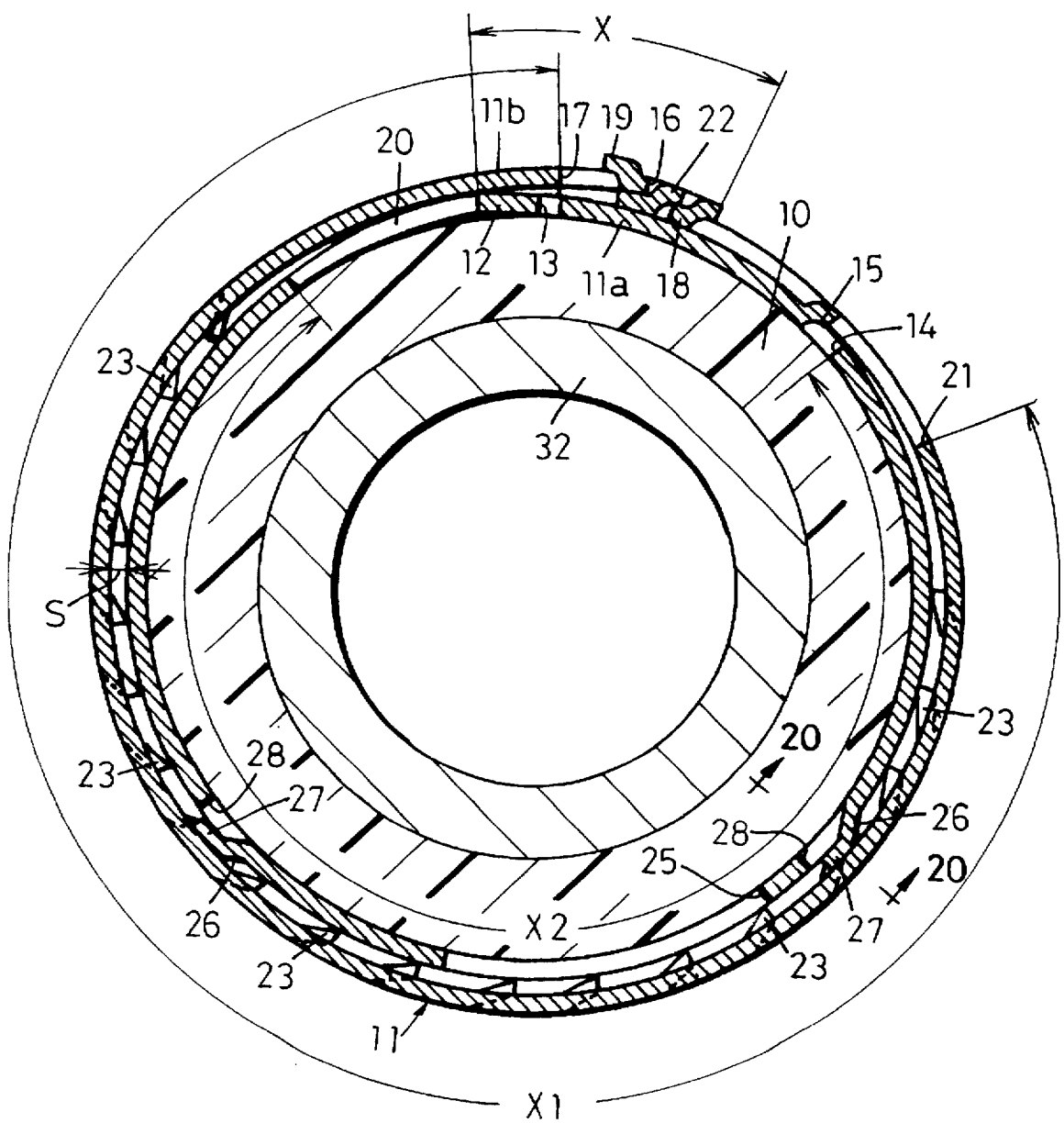
FIG. 19 is a sectional view showing a state of use of FIG. 18.
Figure 20:
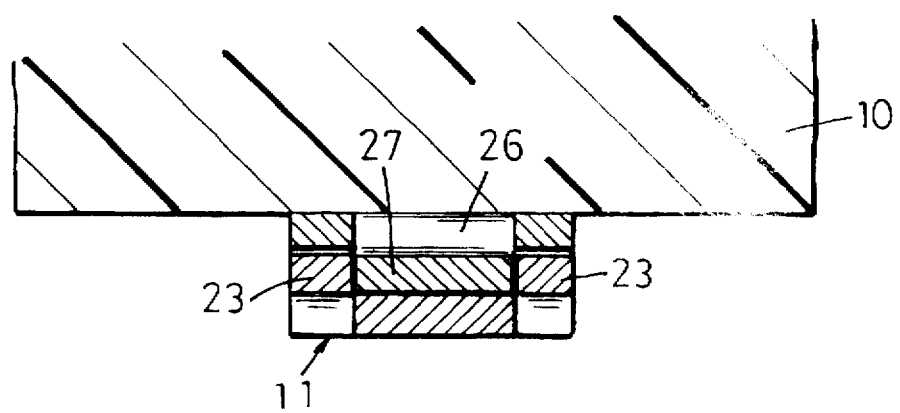
FIG. 20 is an enlarged sectional view taken along the line 20—20 in FIG. 19.

Similarly, according to the arrangements of the second and third embodiments shown in FIGS. 15 through 17, since a plurality of float leg pieces 23 are distributed all at positions deviated to opposite side edges, as is clear from a fourth embodiment shown in FIGS. 18 through 20, one or a plurality of sideward shift-preventive elements 26 positioned on the longitudinal centerline of the metal strip material M can be cut up in an outwardly bent state from said internal contact region X2 of the clamp band 11 so as to be interposed between said float leg pieces 23 distributed on the opposite side edges.

Then, during the temporary locking of the clamp band 11 to the article to be fixed 10 or during the subsequent draw operation on the clamp band using an operating tool, the danger of the internal and external contact regions X2 and X1 which are in a two-layer overlap state being relatively transversely (axially) deviated can be effectively prevented by the sideward shift-preventive elements 26.

It goes without saying that such sideward shift-preventive elements 26 in the fourth embodiment may be formed on the longitudinal centerline of the metal strip material M in substitution for or in addition to the weight reducing punched holes 25.

So long as said sideward shift-preventive elements 26 are interposed between the opposed float leg pieces 23 distributed on opposite sides of the clamp band 11, there is no need for their cut-up front ends to be in contact with the external contact region X1 of the clamp band 11; however, it is preferable that the cut-up front ends be bent in a modified L-shape as seen in plan view to form seats 27 for elastic contact with the external contact region X1, whereby the sideward shift-preventive elements 26 also have the same function as said float leg pieces 23. The numeral 28 denotes cutting lines substantially U-shaped as seen in plan view, applied to the metal strip material M for bending up said sideward shift-preventive elements 26.

FIGS. 21 through 24 show a fifth embodiment of the invention, wherein a plurality of float leg pieces 23 are cut up in an inwardly bent state from the external contact region X1 in the same manner as in the first embodiment shown in FIGS. 1 through 9, distributed on the longitudinal centerline of the metal strip material M with a fixed spacing pitch, the cut-up front ends thereof being subsequently bent in a modified L-shape as seen in plan view to form flat seats 29.

And one or a plurality of extremely elongated leg piece receiving holes 30 for relief reception of such float leg pieces 23 are formed in the internal contact region X2 which overlaps said external contact region X1 in two layers, along the longitudinal centerline of the metal strip material M, so that the seats 29 of the float leg pieces 23 can be brought into elastic contact with the article 10 through the leg piece receiving holes 30 to store diametrically directed spring force in the clamp band 11 itself.

According to such arrangement of the fifth embodiment, since the float leg pieces 23 cut up in an inwardly bent state from the external contact region X1 of said clamp band 11 are adapted to run into the leg piece receiving holes 30 in the internal contact region X2 which overlaps the external contact region X1 in two layers, there is no danger that the internal and external contact regions X1 and X2 which overlap each other in two layers may relatively transversely (axially) during the draw operation on the clamp band 11 using an operating tool to be later described. Furthermore, the formation of said leg piece receiving holes 30 achieves rational weight reduction of the clamp band of the two-loop coiled type claming device.

Further, since the cut-up front ends of the float leg pieces 23 are bent to serve as seats 29, there is no danger of scratching the article 10, and since such distributed seats 29 are elastically contacted with the article 10 through said leg piece receiving holes 30, it is possible to prevent a possibility of accidental idle rotation of the clamp band 11 itself relative to the article 10, thus maintaining it in a safe and firm state during use.

Figure 21:
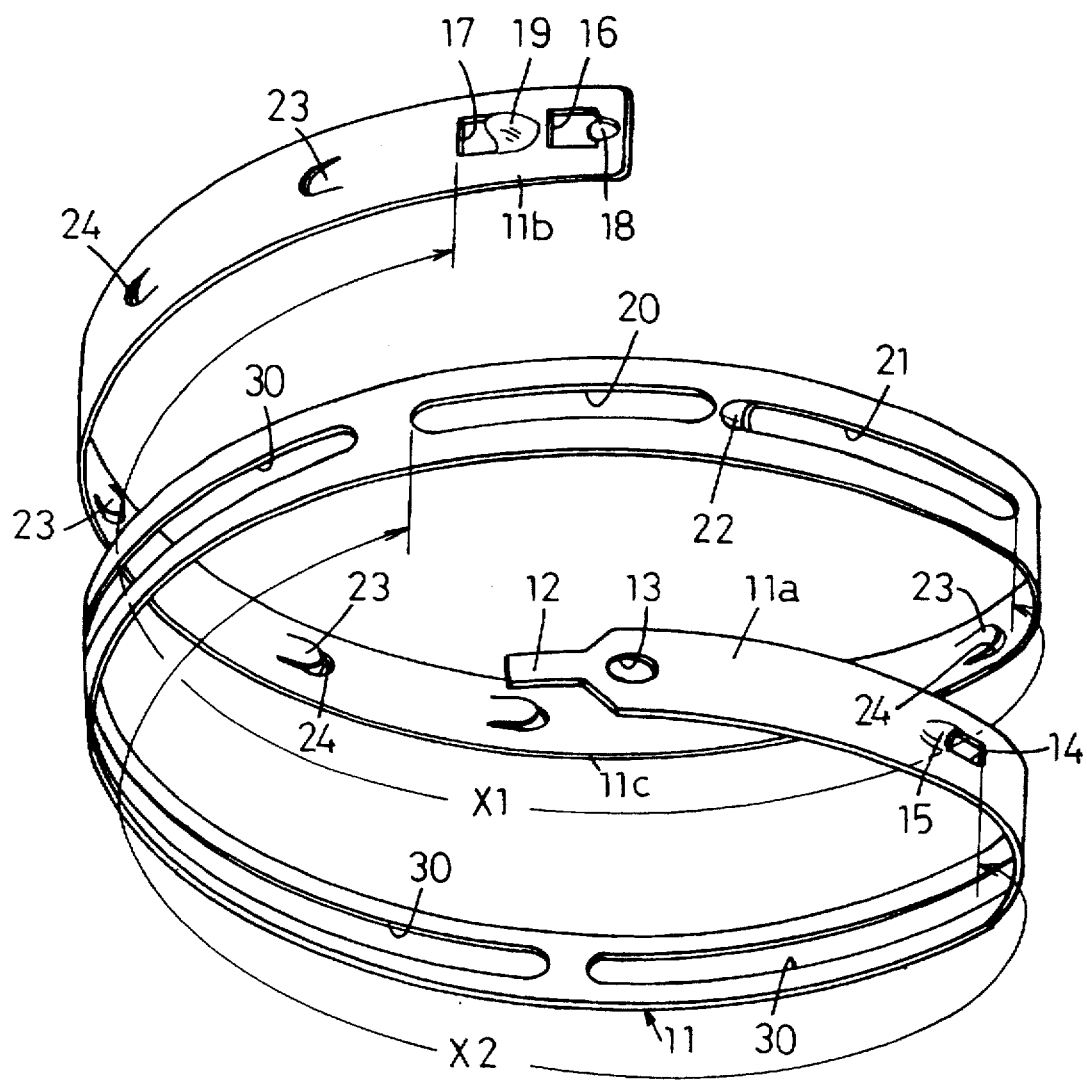
FIG. 21 is a perspective view corresponding to FIG. 3, showing a fifth embodiment of the invention.
Figure 22:
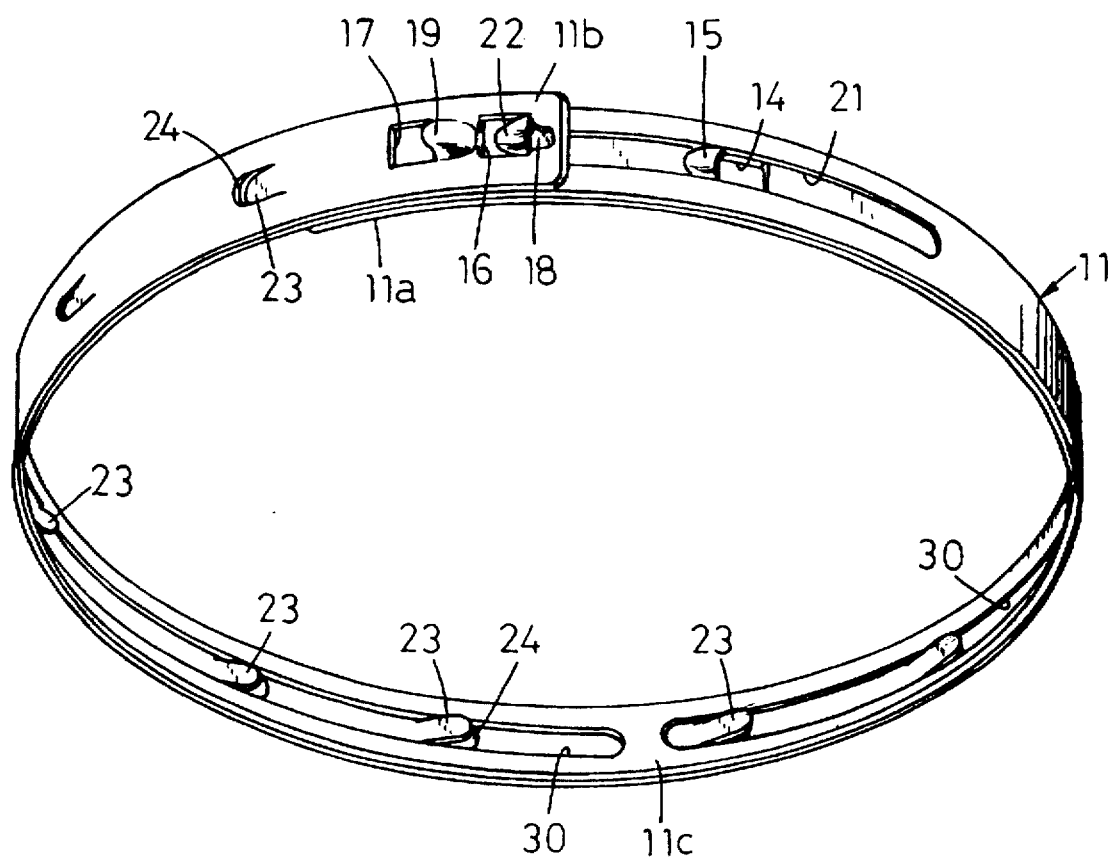
FIG. 22 is a perspective view showing a tightened state of FIG. 21.
Figure 23:
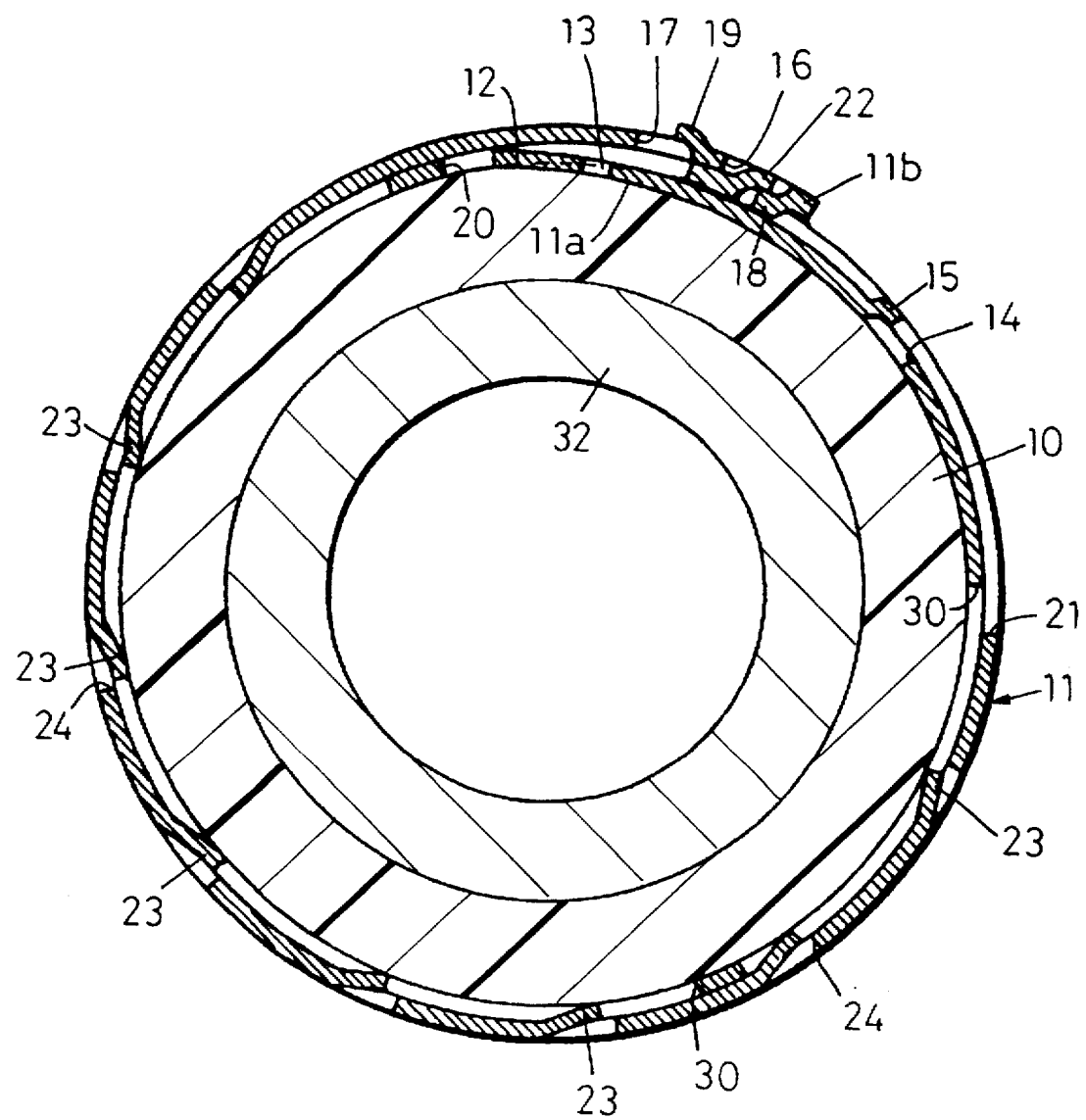
FIG. 23 is a sectional view showing a state of use of FIG. 21.
Figure 24:
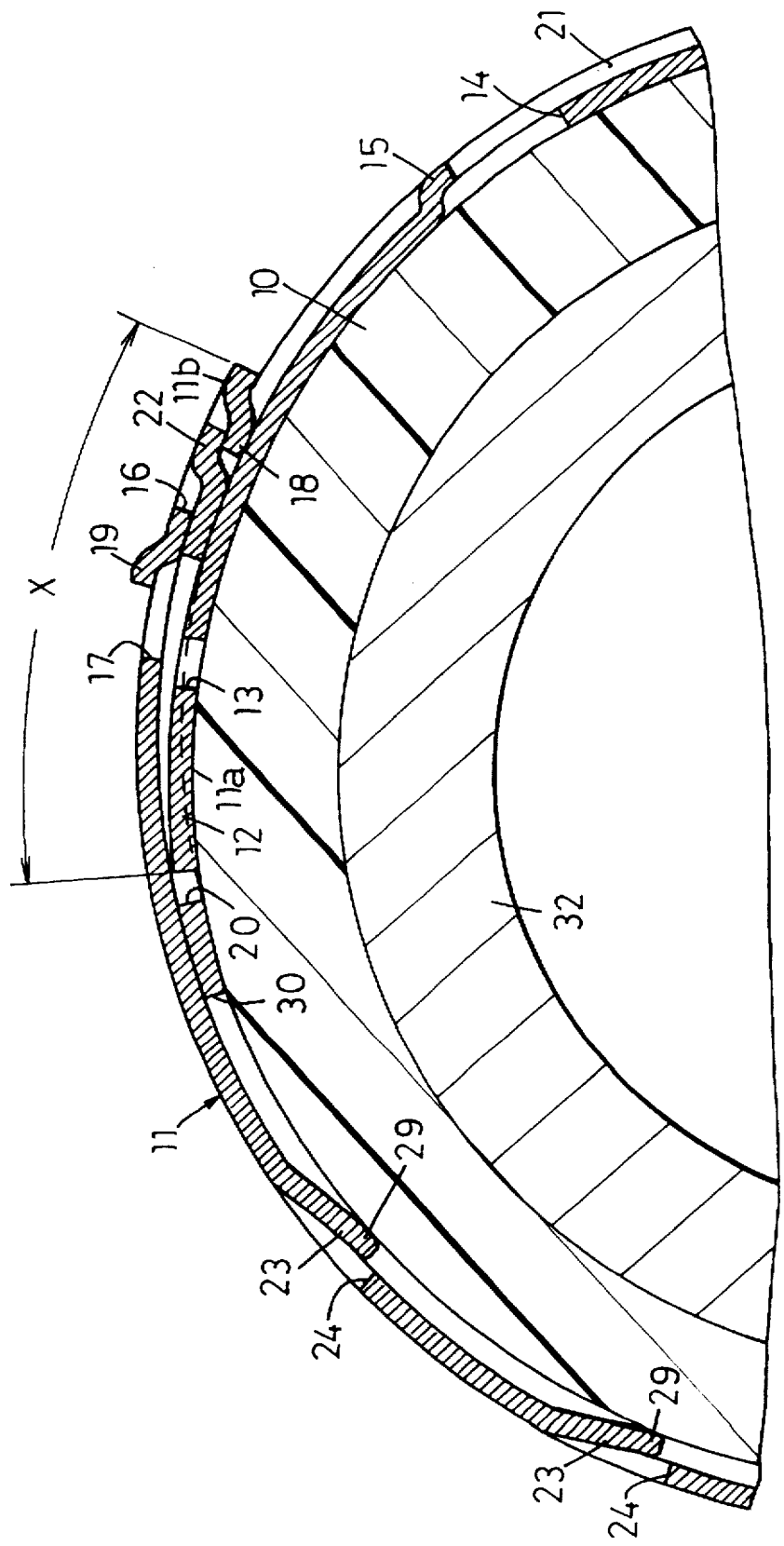
FIG. 24 is an enlarged sectional view of a portion of FIG. 23.
Figure 25:
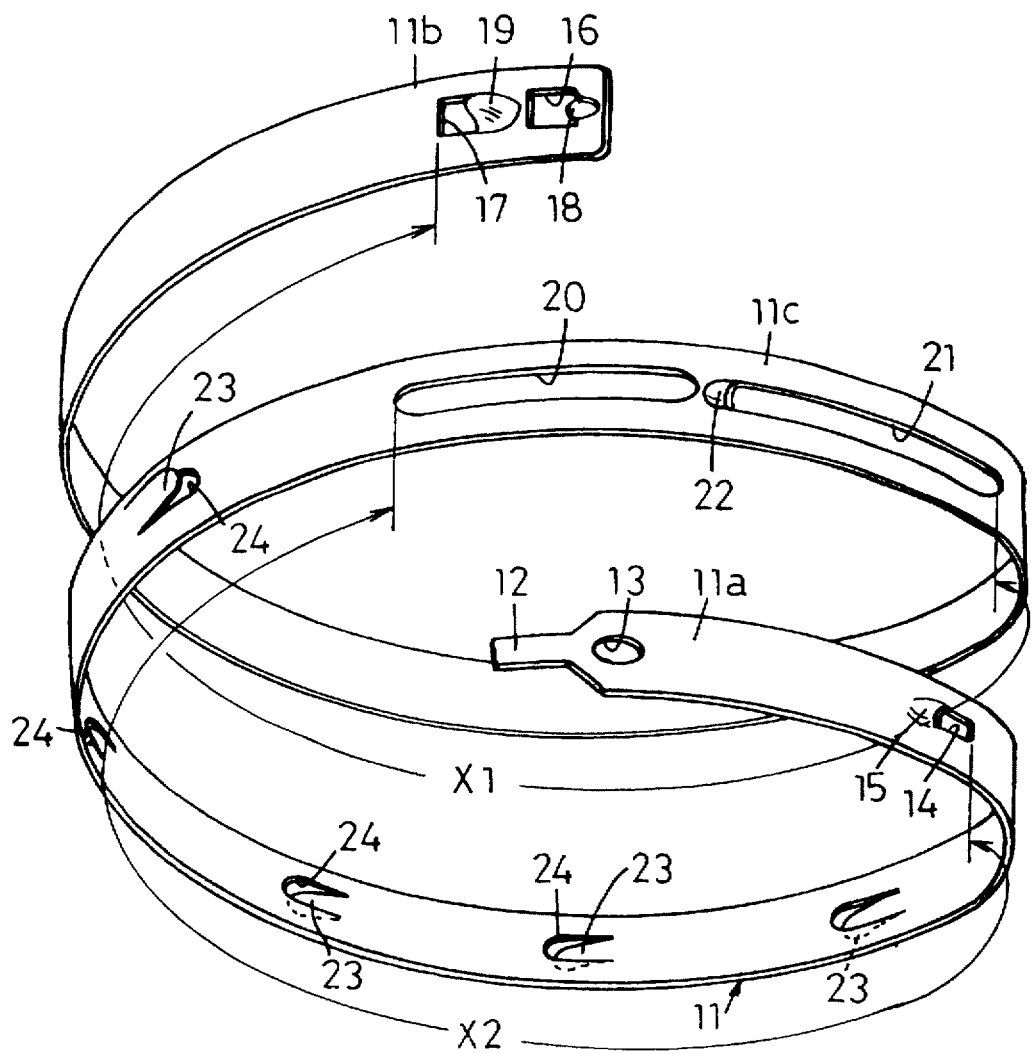
FIG. 25 is a perspective view corresponding to FIG. 3, showing a sixth embodiment of the invention.
Figure 26:
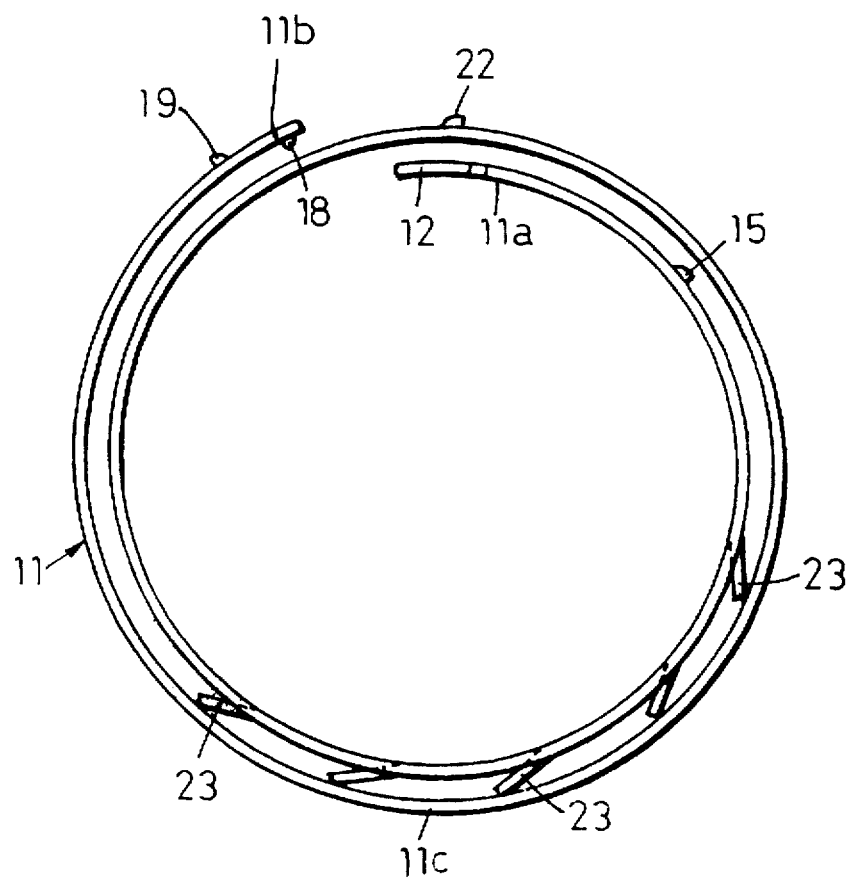
FIG. 26 is a front view of FIG. 25.
Figure 27:
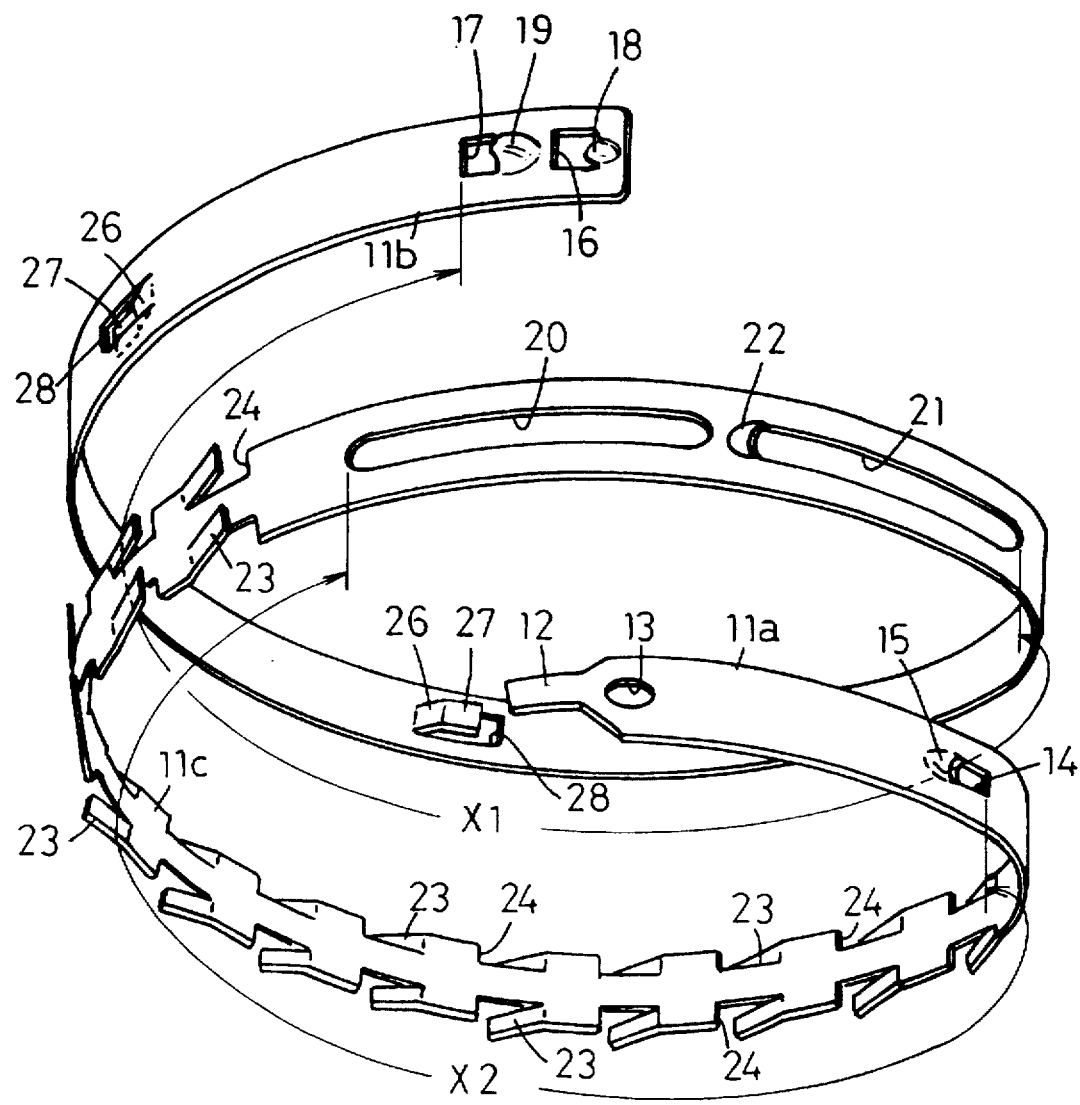
FIG. 27 is a perspective view corresponding to FIG. 3, showing a seventh embodiment of the invention.
Figure 28:
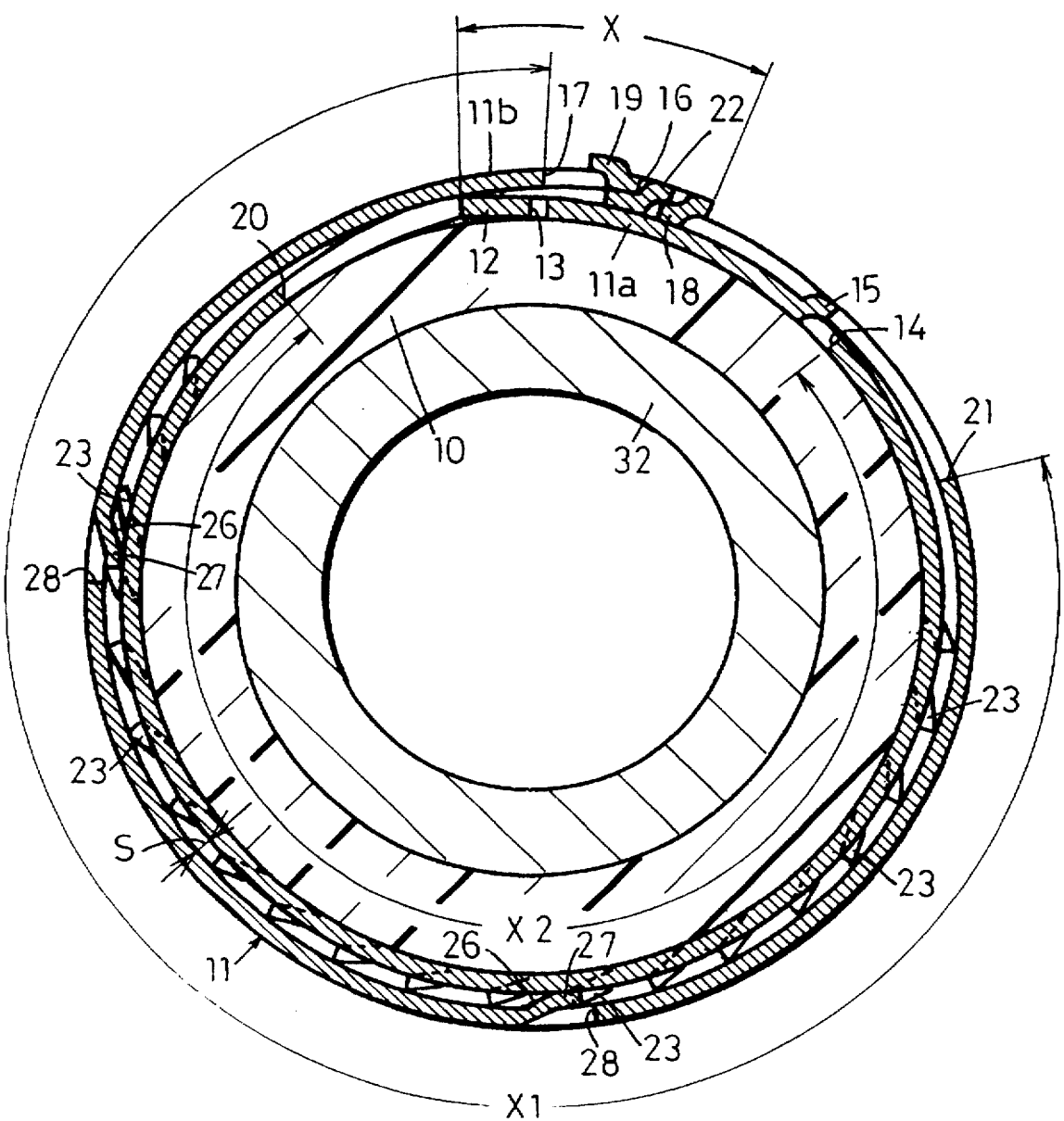
FIG. 28 is a sectional view showing a state of use of FIG. 27.

In the first through fifth embodiments of the invention, a plurality of float leg pieces 23 allowing the clamp band 11 to exert spring force are cut up in an inwardly bent state from the external contact region X1 which overlaps the clamp band 11 in two layers; however, as shown in a sixth embodiment shown in FIGS. 25 and 26 corresponding to FIGS. 3 and 4 and a seventh embodiment shown in FIGS. 27 and 28 corresponding to FIGS. 20 and 21, they may be cut up in a reversely or outwardly bent state from the internal contact region X2 of said clamp band 11 to allow the cut-up front ends of the float leg pieces 23 to elastically contact said external contact region X1.

The reason is that even if such sixth and seventh embodiments are employed, the pilot nose 12 forming one severed end of the inner overlap portion 11a is in a state of being slidable circumferentially of the clamp band 11, so that the float leg pieces 23 cut up in an outwardly bent state from the internal contact region X2 act as spring elements for the clamp band 11 itself, allowing the latter to exert a tightening force on the article 10 for close contact therewith over the entire surface.

When the sixth embodiment is employed, it is possible, though omitted from the figures, to form one or a plurality of punched holes 25 which do not interfere with the float leg pieces 23, in accordance with the second and third embodiments shown in FIGS. 15 through 17, on the longitudinal centerline of the external contact region X1 which overlaps the internal contact region X2 in two layers, or to form holes 30 for receiving said float leg pieces 23 correspondingly on the longitudinal centerline of the external contact region X1, in accordance with the fifth embodiment shown in FIGS. 21 through 24.

Further, when the seventh embodiment is employed, as is clear from FIGS. 27 and 28 and in accordance with the fourth embodiment shown in FIGS. 18 through 20, it is possible to form one or a plurality of sideward shift-preventive elements 26 inwardly cut up from the external contact region X1 of the clamp band 11 or to form one or a plurality of punched holes 25 on the longitudinal centerline of the external contact region X1.

In addition, since the rest of the arrangement in the second through seventh embodiments is substantially the same as in the first embodiment, only reference characters are entered in FIGS. 15 through 28 in connection with FIGS. 1 through 9.

Figure 29:
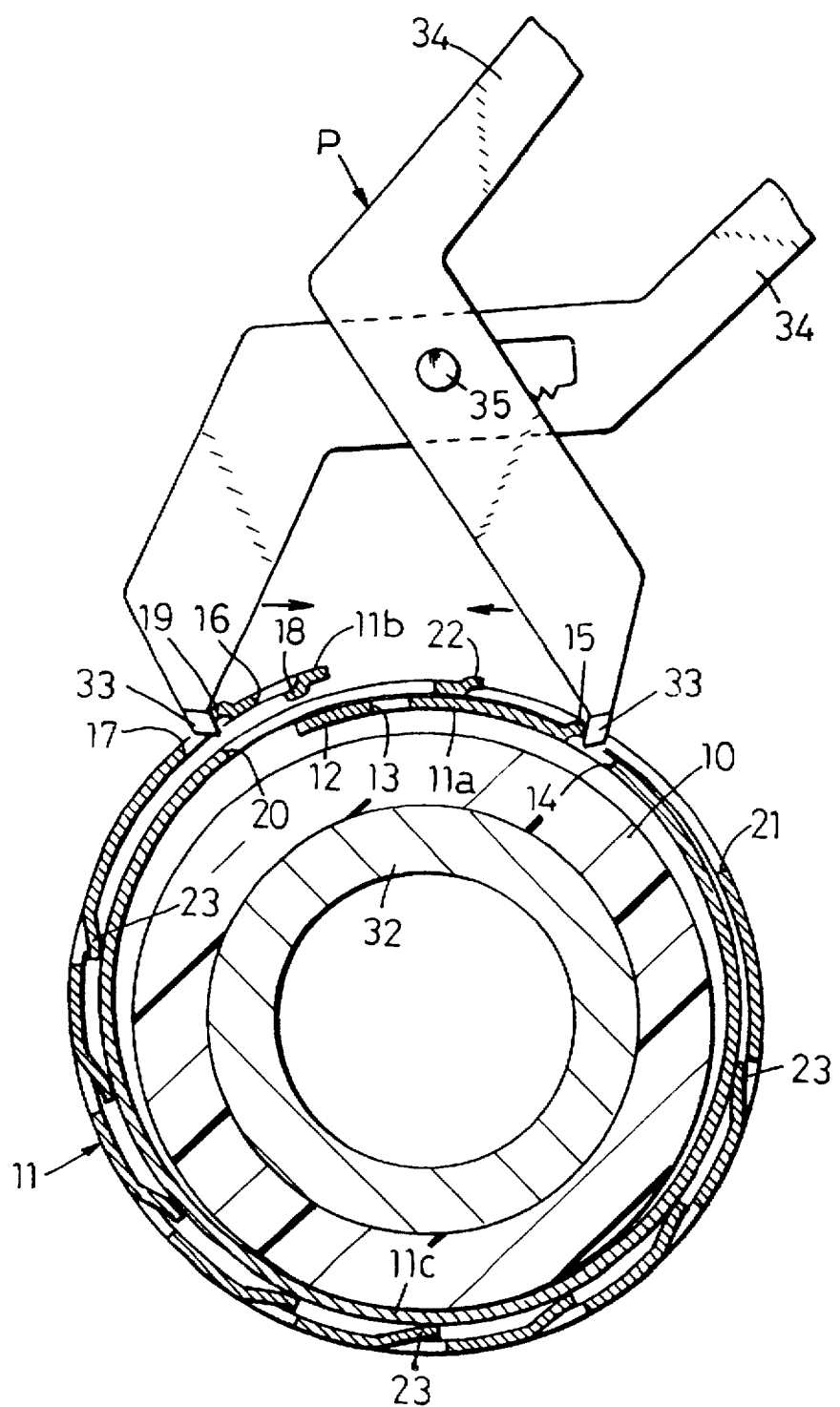
FIG. 29 is a front view showing a clamping device temporarily fixed on an article to be fixed, also showing a locked state of a draw-operating tool.

At any rate, the clamping device is a two-loop coiled type product, wherein the inner and outer overlap portions 11a and 11b of the clamp band 11 are roll-bent in two layers for three dimensionalization while maintaining a three-layer overlap state at an intermediate position by a fixed amount X; therefore, in fixing a fluid conveying hose, dustproof bellows, axial boot or other article to be fixed 10 to the circumferential connecting surface 32 of a device associated therewith, said clamp band 11 is fitted on the article 10 as shown in FIG. 29 and temporarily fixed in position.

In this temporality fixed stated, the inner and outer overlap portions 11a and 11b of the clamp band 11 overlap each other in a loosened state, with the first tool receiving hole 14 in the inner overlap portion 11a being in communication with the tool relief reception communication hole 21 in the intermediate overlap portion 11c externally contacted therewith and being in parallel with the second tool receiving hole 17 in the outer overlap region 11b. Furthermore, the first and second tool locking teeth 15 and 19 cut out in an outwardly raised state from the opening edges of the first and second tool receiving holes 14 and 17 are held mutually reversely directed.

In this state, a pair of working teeth 33 installed on the tips of a draw operating tool P as shown in FIG. 29 are inserted from outside into the first and second tool locking teeth 15 and 19 and engaged with the latter, and then the operator strongly grips the pair of handles 34 to draw said pair of working teeth 33 toward each other around the axis of an assemble pivot shaft 35.

Figure 30:
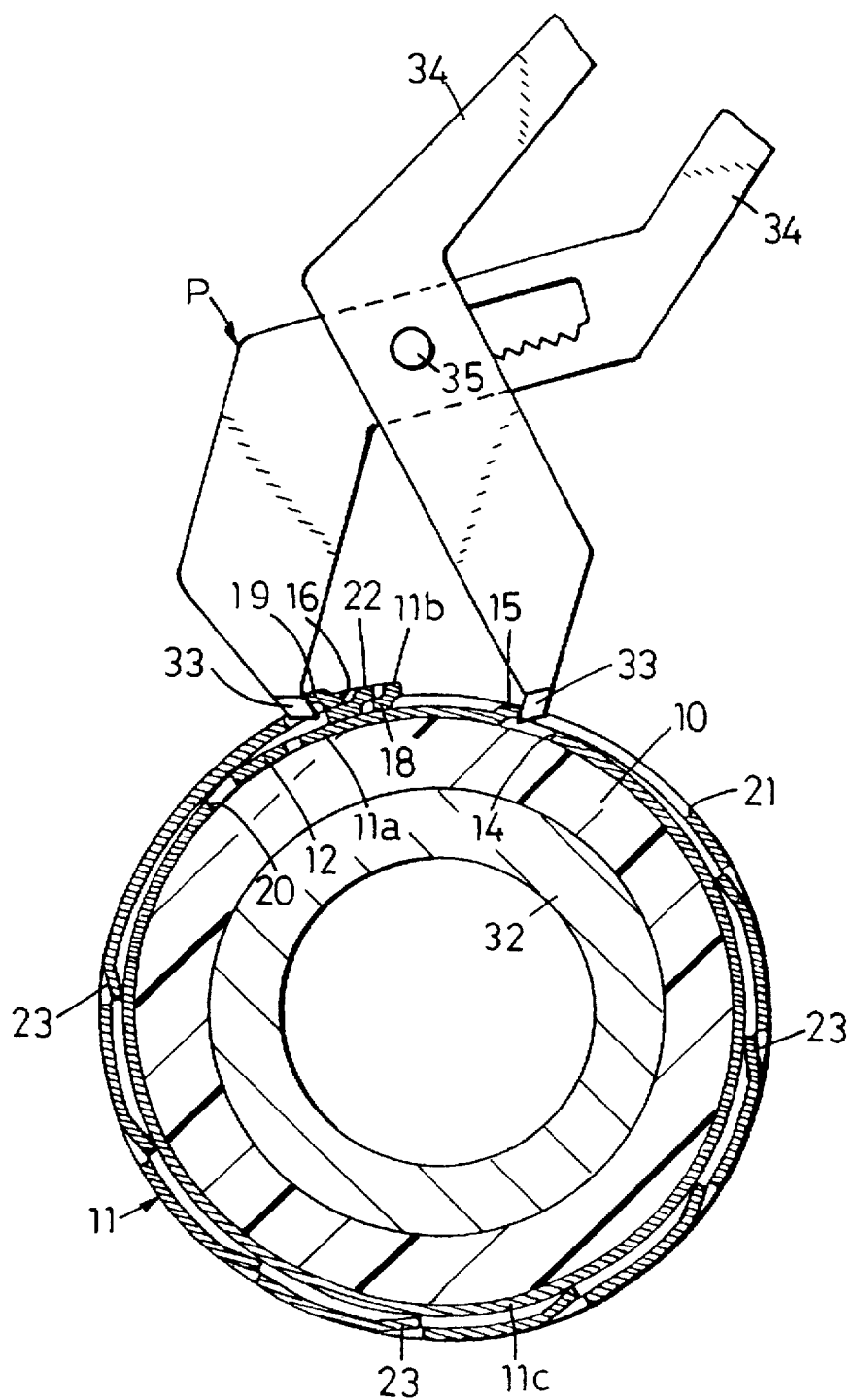
FIG. 30 is a front view showing the clamping device which is by a draw operation which follows FIG. 29.

As a result, the bore diameter of the clamp band 11 is forcibly contracted, during which operation, as is suggested from FIG. 30, the pilot nose 12 forming one severed end of the inner overlap portion 11a runs into the nose receiving hole 20 in the intermediate overlap portion 11c externally contacting the same, while the second tooth 22 bent out in an outwardly raised state from the intermediate overlap portion 11c and the first tooth 18 bent out in an inwardly recessed state from the outer overlap portion 11b externally contacting the same are moved across each other to finally come in seizure engagement with each other, whereupon the article 10, as is clear also from FIGS. 6 through 9, is integrated with the circumferential connecting surface 32 of a desired mating device 31. Thereafter, the working teeth 33 of the operating tool P are extracted, of course.

In that case, the inner and outer overlap portions 11a and 11b of the clamp band 11 are roll-bent in a two-loop coiled state over the entire surface while overlapping each other through the intermediate overlap portion 11c in three layers by a fixed amount X; therefore, with an extremely low tightening torque provided by said draw operating tool P, the bore diameter of the clamp band 11 can be lightly contracted, and it is possible, by maintaining a very high degree of circularity, to bring the inner peripheral surface (clamping surface) of the clamp band 11 into uniform close contact with the article 10 over the entire surface.

Further, in cases where the article to be fixed 10 is made of rubber material having elasticity, its elasticity is enough to clamp said clamp band 11 on the article 10 in a perfectly close contact state. However, even if the object has lost its elasticity due to aging or is made of a rigid synthetic resin material originally having no elasticity, spring force provided by the float leg pieces 23 in the two-layer overlap region is stored in the clamp band 11, so that changes in the hardness or thickness of the article 10 are elastically accommodated or finely adjusted to enable the clamp band to firmly closely contact the article 10 over the entire surface, achieving the overall flattening of the clamp band 11.

As described above, the present invention provides a two-loop coiled type clamping device wherein a clamp band 11 consisting of a metal strip material M cut to a fixed length L is roll-bent in a two-loop circular coiled state for three dimensionalization such that the inner and outer overlap portions 11a and 11b of the clamp band 11 respectively forming one and the other roll-bent end overlap each other through an intermediate overlap portion 11c in three layers by a fixed amount X, the bore diameter of said clamp band 11 being manually forcibly contracted to fix a fluid conveying hose, dustproof bellows, axial boot or other article to be fixed 10 to the circumferential connecting surface 32 of a desired mating device 31, said clamping device being characterized in that the one severed end of said inner overlap portion 11a alone is cut to form a pilot nose 12 having a fixed width W1 smaller than the fixed width W of the metal strip material M, said inner overlap portion 11 being formed with a first tool receiving hole 14, and a first tool locking tooth 15 is bent out in an outwardly raised state from the opening edge of the first tool receiving hole 14 on the side adjacent said pilot nose 12, said outer overlap portion 11b is formed with a first fixing tooth receiving hole 16 and a second tool receiving hole 17 which are juxtaposed in the order mentioned as seen from the other severed end side, while a first fixing tooth 18 is bent out in an inwardly recessed state from the opening edge of the first fixing tooth receiving hole 16 on the other severed end side and a second tool locking tooth 19 is bent out in an outwardly raised state from the opening edge of the second tool receiving hole 17 on the side adjacent the first fixing tooth receiving hole 16, said intermediate overlap portion 11c is formed with a nose receiving hole 20 for relief reception of the pilot nose 12 of the inner overlap portion 11a and a communication hole 21 for relief reception of said first tool locking tooth 15 of said inner overlap portion 11a which are in juxtaposed relation to each other, while a second fixing tooth 22 is bent out in an outwardly raised state from the opening edge of said communication hole 21 on the side adjacent said nose receiving hole 20, the arrangement being such that when the bore diameter of said clamp band 11 is forcibly contracted by applying the pair of working teeth 33 of a draw operating tool P to the first and second tool locking teeth 15 and 19 of the inner and outer overlap portions 11a and 11b, respectively, to draw said pair of working teeth 33 toward each other, the first and second fixing teeth 18 and 22 of the outer and intermediate overlap portions 11b and 11c, respectively, come in seizure engagement with each other, a plurality of distributed float leg pieces 23 are cut up in an inwardly bent state from an external contact region X1 extending from the tool relief reception communication hole 21 in the intermediate overlap portion 11c to the second tool receiving hole 17 in the outer overlap portion 11b, the cut-up front ends of said float leg pieces 23 being elastically contacted with an internal contact region X2 extending from the nose receiving hole 20 in the intermediate overlap portion 11c overlapping said external overlap region X1 in two layers to the first tool receiving hole 14 in the inner overlap portion 11a, thereby storing diametrically directed spring force in said clamp band 11. With this arrangement, various objects of the invention described in the preamble are achieved.

That is, according to the arrangement of the invention described above, the inner and outer overlap portions 11a and 11b of the clamp band 11 for clamping an article to be fixed 10 are roll-bent in an overall two-loop circular coiled state for three dimensionalization such that they, with the intermediate overlap portion 11c interposed therebetween overlap in three layers by a fixed amount X, and said plurality of float leg pieces 23 cut up in an inwardly bent state from the external contact region X1 extending from the tool relief reception communication hole 21 in the intermediate overlap portion 11c to the second tool receiving hole 17 in the outer overlap portion 11b are elastically contacted with the internal contact region X2 extending from the nose receiving hole 20 in the intermediate overlap portion 11c overlapping said external overlap region X1 in two layers to the first tool receiving hole 14 in the inner overlap portion 11a, whereby diametrically directed spring force is stored in the clamp band 11; thus, even if the article 10 is a dustproof bellows or axial boot made of rigid synthetic resin material having no elasticity or even if it is a fluid conveying hose made of rubber material having elasticity but having lost its elasticity due to aging, such article can be totally closely contacted with a very high degree of circularity with the circumferential connecting surface 32 of any mating device 31, thus attaining a safely and firmly clamped state.

Furthermore, the float leg pieces 23 serving as spring elements for the clamp band 11, unlike the elastic humps in the known utility model described in the preamble, are cut up in an inwardly bent state from and distributed in the external contact region X1 where two-layer overlapping of the clamp band 11 takes place, and their cut-up front ends are elastically contacted with the corresponding internal contact region X2; therefore, there is no danger that the weight distribution in the circumferential direction of the clamp band 11 may be particularly biased or interfere with the surrounding members to damage the latter. Thus, since the clamp band maintains its overall flattened state, it can be used without any trouble with vehicles and the like which are subjected to torque, vibration and shock, and thanks to its uniform clamping force acting on the article 10, there is no fear of positional deviation or slipping off of the clamping device.

Further, even if the elastic humps in the known utility model described in the outset enable the clamp band to develop spring force, they are bent up in an outward convex state from the outer overlap portion and locally shifted to one side, so that they are liable to be broken with concentrated stress developed in their bent-up front ends, such breakage resulting in the spring force being no longer developed; thus, there is still a little uncertainty about durability.

In this respect, since the float leg pieces 23 of the present invention are interposed in a distributed state between the external and internal regions X1 and X2 which maintain a two-layer overlap state in the clamp band 11, the stresses acting on them are effectively dispersed, so that even if some of the float leg pieces 23 should be broken, said spring force can be developed without any trouble; thus, the clamping device is superior in durability, a fact which, coupled with the overall two-loop coiled type having a three-layer overlap by a fixed amount X, enables the clamp band 11 to have a very high degree of circularity.

In the intermediate overlap region 11c in the fixed amount X where the inner and outer overlap portions 11a and 11b of the clamp band 11 are held in a tree-layer overlap state, the first fixing tooth 18 bent out in an inwardly recessed state from said outer overlap portion 11b and the second fixing tooth 22 bent out in a reverse or outwardly raised state from the intermediate overlap portion 11c come in seizure engagement, thereby fixing the clamp band 11 in a circular coiled state. Since the first fixing tooth 18 is disposed at the severed end of the outer overlap portion 11b, it eliminates the fear of the outer overlap portion 11b being outwardly turned up from the severed end and the fear associated therewith of the first and second fixing teeth 18 and 22 being disengaged.

Such merits can also be attained substantially in the same manner when the arrangement described in claim 2 is employed. To sum up, in the present invention, it is simply because the clamping device is one which is roll-bent in an overall two-loop coiled state with the inner and outer overlap portions 11a and 11b of the clamp band 11 overlapping each other through the intermediate overlap portion 11c in three layers, that by utilizing the region where the intermediate overlap portion 11c overlaps the inner and outer overlap portions 11a and 11b in two layers, it is possible to form it with a plurality of float leg pieces 23 which serve as spring elements for the clamp band 11, said float leg pieces 23 elastically accommodate changes in the hardness or thickness of the article 10, enabling it to develop the self-adjusting function for close contact with the entire surface of the article 10.

Particularly, if the float leg pieces 23 are distributed in pairs with two in each pair disposed on opposite sides of the metal strip material M as in claim 4, the external and internal regions X1 and X2 where two-layer overlapping of the clamp band takes place can be maintained in a mutually parallel stable overlapping state. As in claims 5 and 8, one or a plurality of elongated punched holes 25 can be formed on the longitudinal centerline of the metal strip material M without any trouble, the formation of such punched holes 25 advantageously contributing to the weight reduction of the clamp band 11.

On the other hand, if the arrangement of claim 7 is employed, one or a plurality of elongated leg piece receiving holes 30 formed in the internal contact region X2 of the clamp band 11, this results no only in achieving the weight reduction of the clamp band 11 itself but also, coupled with presence of the float leg pieces 23 received therein, in maintaining the internal and external contact regions X2 and X1 in an accurate two-layer overlap state preventing them from deviating transversely, while the seats 29 of the float leg pieces 23 elastically contacting the article 10 through said leg piece receiving holes 30 prevent accidental idle rotation of the clamp band 11, thus maintaining the clamp band in a safe and firm state during use.

Further, if the arrangements of claims 6 and 9 are employed, the presence of one or a plurality of transverse deviation preventing elements 26 interposed between opposed float leg pieces 23 distributed on opposite sides of the metal strip material M prevents the external and internal contact regions X1 and X2 overlapping in two layers from relatively transversely (axially) deviating, so that they can be held correctly overlapping each other.

What is claimed is:

1. A two-loop coiled type clamping device wherein a clamp band (11) consisting of a metal strip material (M) cut to a fixed length (L) is roll-bent in a two-loop circular coiled state for three dimensionalization such that the inner and outer overlap portions (11a and 11b) of the clamp band (11) respectively forming one and the other roll-bent end overlap each other through an intermediate overlap portion (11c) in three layers by a fixed amount (X), the bore diameter of said clamp band (11) being manually forcibly contracted to fix a fluid conveying hose, dustproof bellows, axial boot or other article to be fixed (10) to the circumferential connecting surface (32) of a desired mating device (31), said clamping device being characterized in that the one severed end of said inner overlap portion (11a) alone is cut to form a pilot nose (12) having a fixed width (W1) smaller than the fixed width (W) of the metal strip material (M), said inner overlap portion (11) being formed with a first tool receiving hole (14), and a first tool locking tooth (15) is bent out in an outwardly raised state from the opening edge of the first tool receiving hole (14) on the side adjacent said pilot nose (12), said outer overlap portion (11b) is formed with a first fixing tooth receiving hole (16) and a second tool receiving hole (17) which are juxtaposed in the order mentioned as seen from the other severed end side, while a first fixing tooth (18) is bent out in an inwardly recessed state from the opening edge of the first fixing tooth receiving hole (16) on the other severed end side and a second tool locking tooth (19) is bent out in an outwardly raised state from the opening edge of the second tool receiving hole (17) on the side adjacent the first fixing tooth receiving hole (16), said intermediate overlap portion (11c) is formed with a nose receiving hole (20) for relief reception of the pilot nose (12) of the inner overlap portion (11a) and a communication hole (21) for relief reception of said first tool locking tooth (15) of said inner overlap portion (11a) which are in juxtaposed relation to each other, while a second fixing tooth (22) is bent out in an outwardly raised state from the opening edge of said communication hole (21) on the side adjacent said nose receiving hole (20), the arrangement being such that when the bore diameter of said clamp band (11) is forcibly contracted by applying the pair of working teeth (33) of a draw operating tool (P) to the first and second tool locking teeth (15 and 19) of the inner and outer overlap portions (11a and 11b), respectively, to draw said pair of working teeth (33) toward each other, the first and second fixing teeth (18 and 22) of the outer and intermediate overlap portions (11b and 11c), respectively, come in seizure engagement with each other, a plurality of distributed float leg pieces (23) are cut up in an inwardly bent state from an external contact region (X1) extending from the tool relief reception communication hole (21) in the intermediate overlap portion (11c) to the second tool receiving hole (17) in the outer overlap portion (11b), the cut-up front ends of said float leg pieces (23) being elastically contacted with an internal contact region (X2) extending from the nose receiving hole (20) in the intermediate overlap portion (11c) overlapping said external overlap region (X1) in two layers to the first tool receiving hole (14) in the inner overlap portion (11a), thereby storing diametrically directed spring force in said clamp band (11).

2. A two-loop coiled type clamping device wherein a clamp band (11) consisting of a metal strip material (M) cut to a fixed length (L) is roll-bent in a two-loop circular coiled state for three dimensionalization such that the inner and outer overlap portions (11a and 11b) of the clamp band (11) respectively forming one and the other roll-bent end overlap each other through an intermediate overlap portion (11c) in three layers by a fixed amount (X), the bore diameter of said clamp band (11) being manually forcibly contracted to fix a fluid conveying hose, dustproof bellows, axial boot or other article to be fixed (10) to the circumferential connecting surface (32) of a desired mating device (31), said clamping device being characterized in that the one severed end of said inner overlap portion (11a) alone is cut to form a pilot nose (12) having a fixed width (W1) smaller than the fixed width (W) of the metal strip material (M), said inner overlap portion (11a) being formed with a first tool receiving hole (14), and a first tool locking tooth (15) is bent out in an outwardly raised state from the opening edge of the first tool receiving hole (14) on the side adjacent said pilot nose (12), said outer overlap portion (11b) is formed with a first fixing tooth receiving hole (16) and a second tool receiving hole (17) which are juxtaposed in the order mentioned as seen from the other severed end side, while a first fixing tooth (18) is bent out in an inwardly recessed state from the opening edge of the first fixing tooth receiving hole (16) on the other severed end side and a second tool locking tooth (19) is bent out in an outwardly raised state from the opening edge of the second tool receiving hole (17) on the side adjacent the first fixing tooth receiving hole (16), said intermediate overlap portion (11c) is formed with a nose receiving hole (20) for relief reception of the pilot nose (12) of the inner overlap portion (11a) and a communication hole (21) for relief reception of said first tool locking tooth (15) of said inner overlap portion (11a) which are in juxtaposed relation to each other, while a second fixing tooth (22) is bent out in an outwardly raised state from the opening edge of said communication hole (21) on the side adjacent said nose receiving hole (20), the arrangement being such that when the bore diameter of said clamp band (11) is forcibly contracted by applying the pair of working teeth (33) of a draw operating tool (P) to the first and second tool locking teeth (15 and 19) of the inner and outer overlap portions (11a and 11b), respectively, to draw said pair of working teeth (33) toward each other, the first and second fixing teeth (18 and 22) of the outer and intermediate overlap portions (11b and 11c), respectively, come in seizure engagement with each other, a plurality of distributed float leg pieces (23) are cut up in an outwardly bent state from an internal contact region (X2) extending from the nose receiving hole (20) in the intermediate overlap portion (11c) to the first tool receiving hole (14) in the inner overlap portion (11a), the cut-up front ends of said float leg pieces (23) being elastically contacted with an external contact region (X1) extending from the tool relief reception communication hole (21) in the intermediate overlap portion (11c) overlapping said internal overlap region (X2) in two layers to the second tool receiving hole (17) in the outer overlap portion (11b), thereby storing diametrically directed spring force in said clamp band (11).

3. A two-loop coiled type clamping device as set forth in claim 1 or 2, characterized in that said plurality of float leg pieces (23) are distributed on the longitudinal centerline of the metal strip material (M) with a fixed spacing pitch.

4. A two-loop coiled type clamping device as set forth in claim 1 or 2, characterized in that said plurality of float leg pieces (23) are distributed in pairs with two in each pair disposed in a juxtaposed or zigzag state on opposite sides of the metal strip material (M).

5. A two-loop coiled type clamping device as set forth in claim 1, characterized in that said plurality of float leg pieces (23) are cut up in an inwardly bent state from the external contact region (X1) of the clamp band (11) such that they are distributed along opposite side edges of the metal strip material (M), while the internal contact region (X2) overlapping the external contact region (X1) in two layers is formed with one or a plurality of elongated punched holes (25) disposed on the longitudinal centerline of the metal strip material (M).

6. A two-loop coiled type clamping device as set forth in claim 1, characterized in that said plurality of float leg pieces (23) are cut up in an inwardly bent state from the external contact region (X1) of the clamp band (11) such that they are distributed along opposite side edges of the metal strip material (M), while one or a plurality of transverse shift preventing elements (26) disposed on the longitudinal centerline of the metal strip material (M) are cut up from the internal contact region (X2) overlapping the external contact region (X1) in two layers.

7. A two-loop coiled type clamping device as set forth in claim 1, characterized in that said plurality of float leg pieces (23) are cut up in an inwardly bent state from the external contact region (X1) of the clamp band (11) such that they are distributed along longitudinal centerline of the metal strip material (M), the cut-up front ends thereof being bent to form flat seats (29), while one or a plurality of elongated leg piece receiving holes (30) for relief reception of said float leg pieces (23) are correspondingly formed in the internal contact region (X2) overlapping the external contact region (X1) in two layers.

8. A two-loop coiled type clamping device as set forth in claim 2, characterized in that said plurality of float leg pieces (23) are cut up in an outwardly bent state from the internal contact region (X2) of the clamp band (11) such that they are distributed along opposite side edges of the metal strip material (M), while the external contact region (X1) overlapping the internal contact region (X2) in two layers is formed with one or a plurality of elongated punched holes (25) disposed on the longitudinal centerline of the metal strip material (M).

9. A two-loop coiled type clamping device as set forth in claim 2, characterized in that said plurality of float leg pieces (23) are cut up in an outwardly bent state from the internal contact region (X2) of the clamp band (11) such that they are distributed along opposite side edges of the metal strip material (M), while one or a plurality of transverse shift preventing elements (26) disposed on the longitudinal centerline of the metal strip material (M) are cut up from the external contact region (X1) overlapping the internal contact region (X2) in two layers.

* * * * *